United States Patent
Suzuki et al.

(10) Patent No.: US 6,535,114 B1
(45) Date of Patent: Mar. 18, 2003

(54) METHOD AND APPARATUS FOR ENVIRONMENT RECOGNITION

(75) Inventors: Toshihiko Suzuki, Mishima (JP); Takeo Kanade, Pittsburgh, PA (US)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/533,167

(22) Filed: Mar. 22, 2000

(51) Int. Cl.$^7$ ................................................. B60Q 1/00
(52) U.S. Cl. ..................... 340/435; 340/436; 340/903; 340/907; 348/148; 348/149
(58) Field of Search ................... 340/435, 937, 340/903, 901, 436; 318/480; 348/148, 162, 164, 149, 150; 701/25, 300, 301

(56) References Cited

U.S. PATENT DOCUMENTS

| | | | |
|---|---|---|---|
| 5,515,419 A | 5/1996 | Sheffer | 379/58 |
| 5,664,227 A * | 9/1997 | Mauldin et al. | 395/778 |
| 5,731,757 A | 3/1998 | Layson, Jr. | 340/573 |
| 5,867,103 A | 2/1999 | Taylor, Jr. | 340/573 |
| 5,892,855 A * | 4/1999 | Kakinami et al. | 382/291 |
| 5,894,323 A * | 4/1999 | Kain et al. | 348/116 |
| 6,054,928 A | 4/2000 | Lemelson et al. | 340/573.4 |
| 6,067,110 A * | 4/2000 | Nonaka et al. | 348/148 |
| 6,072,396 A | 6/2000 | Gaukel | 340/573.4 |
| 6,083,353 A * | 7/2000 | Alexander, Jr. | 202/158 |
| 6,100,806 A | 8/2000 | Gaukel | 340/573.4 |
| 6,118,475 A * | 9/2000 | Iijima et al. | 348/42 |
| 6,151,539 A * | 11/2000 | Bergholz et al. | 701/25 |
| 6,154,149 A * | 11/2000 | Tyckowski et al. | 340/903 |
| 6,172,601 B1 * | 1/2001 | Wada et al. | 340/436 |

FOREIGN PATENT DOCUMENTS

| | | |
|---|---|---|
| JP | 10222679 | 8/1998 |
| WO | WO 97/35161 | 9/1967 |

OTHER PUBLICATIONS

Bergen, J.R., et al., "Hierarchical Model–Based Motion Estimation," David Sarnoff Research Center, Princeton, NJ.
Delbert, F., et al., "Robust car tracking using Kalman filtering and Bayesian templates," Dept. of Computer Science and The Robotics Institute, Carnegie Mellon University, Pittsburgh, PA, 1998.
Williamson, T., et al., "A Specialized Multibaseline Stereo Technique for Obstacle Detection," Robotics Institute, Carneige Mellon University, Pittsburgh, PA, 1998.
Williamson, T., et al., "Detection of Small Obstacles at Long Range Using Multibaseline Stereo," Robotics Institute, Carnegie Mellon University, Pittsburgh, PA.
IEEE/IEEJ/JSAI International Conference on Intelligent Transportation Systems, held in Tokyo, Japan from Oct. 5–8, 1999.

(List continued on next page.)

Primary Examiner—Jeffrey Hofsass
Assistant Examiner—Davetta W. Goins
(74) Attorney, Agent, or Firm—Finnegan, Henderson, Farabow, Garrett & Dunner, L.L.P.

(57) ABSTRACT

Images are captured using a single camera in motion. A recognition process section detects a possible object in a photographed image, tracks the possible object within the moving image, and generates object shape information from the trajectory information. A motion and pose determination section determines camera motion and pose using the photographed images for recognition processing. The determined data are used for object recognition along with the tracking information. The motion and pose determination section converts the optical flow parameters obtained from the photographed images into physical parameters in three-dimensional space. An Extended Kalman Filter is used for both the determination of motion and pose and for object recognition.

32 Claims, 13 Drawing Sheets

OTHER PUBLICATIONS

Williamson, T., "A High Performance Stereo Vision System for Obstacle Detection," doctoral dissertation, tech. report CMU–RI–TR–98–24, Robotics Institute, Carnegie Mellon University, Sep. 1998.

K. Kanatani, "Gazo Rikai," Morikita Publishing, Tokyo, May 24, 1990.

Dickmanns, E., et al., "Recursive 3–D Road and Relative Ego–State Recognition," IEEE Transactions of Pattern Analysis and Machine Intelligence, vol. 14, No. 2, Feb. 1992.

Alcatel USA, White Paper "iMLS—Intelligent Mobile Location Server", 14 pages, May 2000.

Alcatel USA, "Intelligent Mobile Location Server–Enbaling Location Services", 24 pages, May 2000.

English language translation JP 10–222679.

* cited by examiner

* cited by examiner

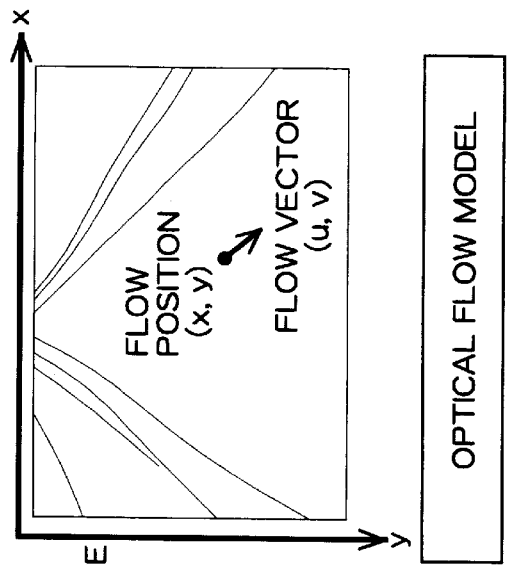
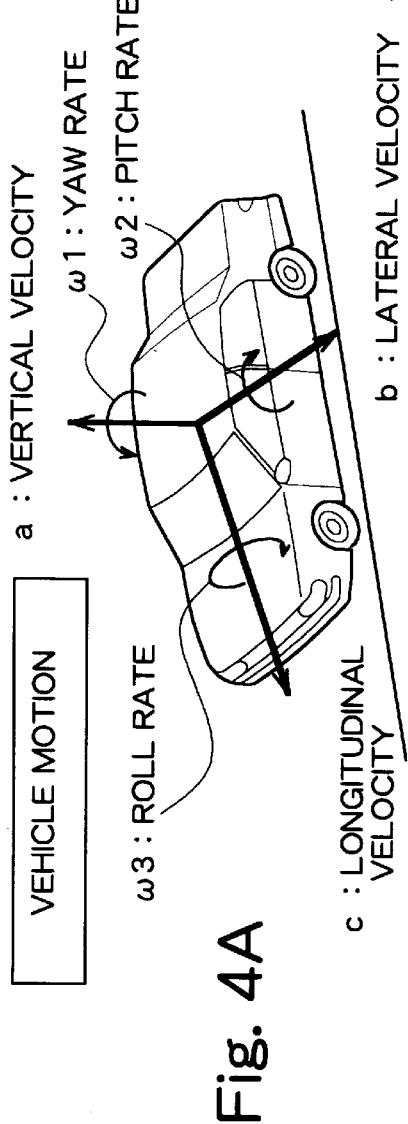
Fig. 4A
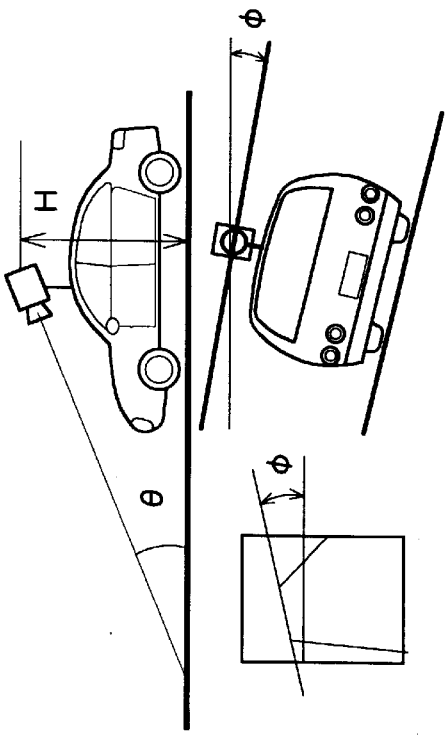
Fig. 4C
Fig. 4B

VERTICAL SPEED

CAMERA ANGLE

ROLL RATE

ELEVATION CHANGE

LATERAL SPEED

ROLL ANGLE

METHOD AND APPARATUS FOR ENVIRONMENT RECOGNITION

BACKGROUND OF THE INVENTION

1. Field of the Invention

The present invention relates to a method and apparatus for environment recognition, and particularly to a technique for recognizing an object in three-dimensions using images photographed by a single camera while in motion. The present invention further relates to a technique for determining the motion and orientation of the camera itself using the photographed images. Preferably, a camera mounted on a vehicle is used to detect obstacles surrounding a vehicle and to determine the motion of the vehicle. However, the present invention is not limited to such applications.

2. Description of the Background Art

Conventionally, three types of sensors are known for use on vehicles to detect obstacles on a road surface, millimeter wave radar, laser radar, and vision system using photographed images.

Millimeter wave radar and laser radar are generally considered to operate very reliably under unfavorable conditions, and are adopted for practical use in auto cruise control systems. However, these sensors do not easily detect small, non-metallic obstacles such as tires and wooden boxes.

As vision systems, a variety of stereo systems have been proposed including, for example, that detailed in "A High-Performance Stereo Vision System for Obstacle Detection," T. Williamson, Ph. D Thesis, The Robotics Institute, Carnegie Mellon University, Pittsburgh, Pa., October 1998. However, a stereo system requires a plurality of cameras, which is disadvantageous considering necessary space and cost.

Further, in a stereo system, it is usually necessary to provide a baseline longer than 1 m to adequately enhance the range resolution. In addition, long focal-length lenses must be used to achieve high spatial resolution. In some systems, more than three cameras are used to better ensure reliable results. These requirements may restrict the possible camera installation positions and, as a result, reduce the range of camera field of view allowed for use.

On the other hand, use of a single camera for object recognition has also been proposed. The natural baseline between human eyes is not sufficiently long for drivers to recognize distant objects with stereopsis. Rather, drivers rely on motion stereo and/or intensity cues. By adopting such scheme in an artificial system, it is possible to recognize obstacles using only one camera and thereby reduce system cost.

In one recognition technique using motion cues, the use of optical flow has been suggested. An obstacle can be detected based on the difference in the optical flows generated by the obstacle and the background.

Specifically, optical flow vectors generated from the images of a planar road surface conform to specific equations. Optical flow vectors are vectors that connect an identical point in a continuous series of images. When a point in an image is not on the road surface, the optical flow vector of the point does not follow the equations. An object having a different height from the road surface can be recognized accordingly.

General techniques for image processing using optical flow are described in, for example, "Gazo Rikai", K. Kanatani, Morikita Publishing, Tokyo, 1990. Techniques are also disclosed in International Publication No. WO97/35161. These documents are incorporated herein by reference.

However, when attempting to detect an obstacle from camera images using only optical flows, accurate detection with respect to a small obstacle is difficult because the difference between the optical flow vectors of such an obstacle and the road surface is very small. Similarly, accurate detection is also difficult when the time difference in the optical flow calculation is small or when the camera motion is slow.

In the example of FIG. 1, the camera height is 1.5 m, and an object with a height of 15 cm is located 90 m ahead of the camera. In the camera image, the uppermost point of the object is in an identical position with a point on the road plane located 100 m ahead. The angle at which the camera looks down at the two points is 0.853 degrees.

If a second image is obtained after the vehicle traveled 1 m at 100 km/h, the camera then looks down at the uppermost point of the object at 0.868 degrees, while the viewing angle with respect to the aforementioned point on the road plane is 0.869 degrees. The difference between these angles is extremely small. Under such conditions, it is difficult to detect the obstacle by comparing the optical flow vectors.

Although problems in obstacle detection was explained above using an example based on a vehicle-mounted camera, similar problems also exist in other known recognition techniques. Other techniques related to the present invention include those discussed in "A Specialized Multi-baseline Stereo Technique for Obstacle Detection," T. Williamson and C. Thorpe, Proceedings of the International Conference on Computer Vision and Pattern Recognition (CVPR '98), Santa Barbara, Calif., June 1998, and in "Detection of Small Obstacles at Long Range Using Multibaseline Stereo," T. Williamson and C. Thorpe, Proceedings of the 1998 IEEE International Conference on Intelligent Vehicles, Stuttgart, Germany, October 1998.

The present invention was created in light of the above problems. The primary object of the present invention is to provide a method and apparatus that can enhance recognition capability with respect to small objects.

SUMMARY OF THE INVENTION

To accomplish the above object, the present invention provides a method for recognizing, through image processing, an object from images captured by photographing a surrounding region with a camera. According to the present invention, a sequence of images is captured using a single camera in motion. The camera movement may be a displacement relative to the object. A possible object captured in an image is identified, and the identified possible object is tracked within the image sequence. Three-dimensional object information is generated based on information obtained by the tracking concerning changes in the images of the possible object.

The three-dimensional object information may concern, for example, height, location, width, or shape. The object information may include simple information such as the presence of protrusion of the object from the background. Preferably, dimensions, such as height, of the object protrusion are included in the information.

As the present invention tracks a possible object, differences between the image movement of the possible object and that of portions other than the possible object are more apparent, and object recognition ability is enhanced. Accurate object recognition is possible even for small objects, even when the time interval between captured images is short (high capture rate), and even when the camera is moving slow.

The present invention is effective even when the object of recognition and the background have similar colors (intensity). A portion that has a similar color to the background can be provisionally identified as a possible object and tracked. Based on the data collected during the tracking, it is judged whether or not the possible object is a real object. For example, a judgement is made as to whether or not the possible object protrudes from the road plane. In this way, the present invention can similarly enhance recognition capability related to photographing conditions.

Preferably, motion of the camera during the tracking is measured, and the tracking information is processed along with data for the determined camera motion. Generally, camera motion would be equivalent to the motion of the moving structure on which the camera is mounted. By taking into account such motion, success of recognition of the location, size, and other information on the object is enhanced. More preferably, camera pose is also determined along with camera motion, and the tracking information is processed based on the determined camera motion and pose. Pose includes orientation and location. By taking into account such motion and pose, location of the object relative to the camera can be reliably recognized.

Further, motion and pose are preferably determined using the image sequence. The image sequence photographed by a single camera is used not only for the object recognition, but also for the determination of the camera motion and pose on which the object recognition is based. This eliminates the need for sensors exclusively for the detection of various parameters related to motion and pose, and provides an advantage with regard to cost.

Detection signals from a camera motion sensor can also be used in addition to the image sequence when determining motion and pose, thereby increasing reliability.

Preferably, when determining motion and pose, flow parameters in image coordinates of the image sequence are converted into physical parameters in three-dimensional coordinates, and the motion and pose are then calculated. The optical flow parameters in image coordinates are not suitable for accumulation (integral) processing. Physical parameters in three-dimensional coordinates, on the other hand, can be easily accumulated and used for the determination of motion and pose during tracking.

Considering a case in which optical flow parameters are accumulated, a difference may be obtained in the accumulation results at a level that allows distinguishing between the object and the background. However, physical values, i.e., dimensions such as height, size, distance, and width, cannot be determined from the accumulation of flow parameters. The present invention, in contrast, accumulates physical parameters in three-dimensional coordinates, allowing determination of how the camera moved during the tracking. Based on the accumulated information and the movement of the possible object in the images, the three-dimensional shape of the object can be physically identified, allowing calculation of any desired physical values such as dimensions. In this way, the present invention enables precise recognition of object information, this being one major advantage of the present invention.

A Kalman Filter capable of non-linear processing may preferably be used for motion and pose determination to successfully process non-linear data and to reduce influences of noise in the images.

Further, gradient of the surface on which the camera moves may be determined. Recognition processing is performed while relating camera motion and gradient to the tracking information to thereby recognize objects more accurately.

Preferably, in determining the gradient, gradient information is obtained based on the difference between the estimated pitch angle estimated from the image sequence as the camera motion and the detected pitch angle detected using a sensor. It may similarly be preferable in this case to use a Kalman Filter capable of non-linear processing.

It may also be preferred to use a Kalman Filter capable of non-linear processing in the recognition step. Preferably, when a new possible object is detected, a Kalman Filter is assigned to the new possible object. A plurality of Kalman Filters are used to perform recognition processing for a plurality of possible objects. Accordingly, multiple objects successively appearing in the images can be favorably detected.

Preferably, each of the images are divided into a plurality of sections. Based on the results of the recognition processing with respect to each of the divided sections, information on unevenness between the sections is obtained. In this case, irregularities in the surface on which the camera moves are determined by treating each divided section as a possible object during the recognition processing.

One aspect of the present invention relates to a method or apparatus for recognizing, through image processing, an object captured in images. According to the present invention, a sequence of images is obtained by photographing with a single camera in motion. The photographed object captured in images is tracked within the image sequence. Based on information obtained by the tracking concerning positional changes of the images of the photographed object, three-dimensional information on the photographed object is generated.

Although the recognition technique of the present invention is suitable for application in obstacle detection in moving vehicles, the present invention is not limited to such use. For example, the present invention may be used for controlling any desired vehicle or for creating three-dimensional maps. Further, the present invention may be implemented in structures other than vehicles, such as surveillance cameras.

While in the above aspects of the environment recognition method and apparatus were described in connection with an object of the present invention being the provision of an improved environment recognition technique, the present invention is not limited to this aspect.

An additional object of the present invention is to provide a method and apparatus for successful motion detection. According to one aspect of the present invention, motion is determined using images captured by a single camera in motion. During determination processing, optical flows are suitably converted into physical parameters in three-dimensional coordinates. A Kalman Filter is favorably used for the determination processing. In this way, the motion of the camera itself or the moving structure on which the camera is mounted is determined. Pose can be determined together with motion, or pose alone may be determined. Use of the results are not limited to environment recognition. For example, by mounting the camera on a vehicle, the determined results can be used for vehicle control including control of various actuators (engine, brake, transmission, or steering devices).

In another aspect, the present invention takes the form of a gradient determining method and apparatus using photographed images to determine gradient of a surface along which a camera moves. The gradient is determined based on an estimated pitch angle obtained by image processing and a detected pitch angle obtained through a sensor. The determined gradient can be used for object recognition and other purposes, such as vehicle control.

BRIEF DESCRIPTION OF THE DRAWINGS

FIGS. 4A–4C are diagrams schematically illustrating the camera motion and pose determination processing using photographed images.

DESCRIPTION OF THE PREFERRED EMBODIMENT

A preferred embodiment of the present invention will now be described referring to the accompanying drawings.

In the preferred embodiment of the present invention, for illustrative purposes, a camera is mounted on a vehicle, and an obstacle on a road surface is detected. In the following description, a structural portion that does not lie within the road plane and an object that protrudes from the road plane are defined as obstacles. As the camera is fixed on the vehicle, camera motion is basically equivalent to vehicle motion.

Figure 1:
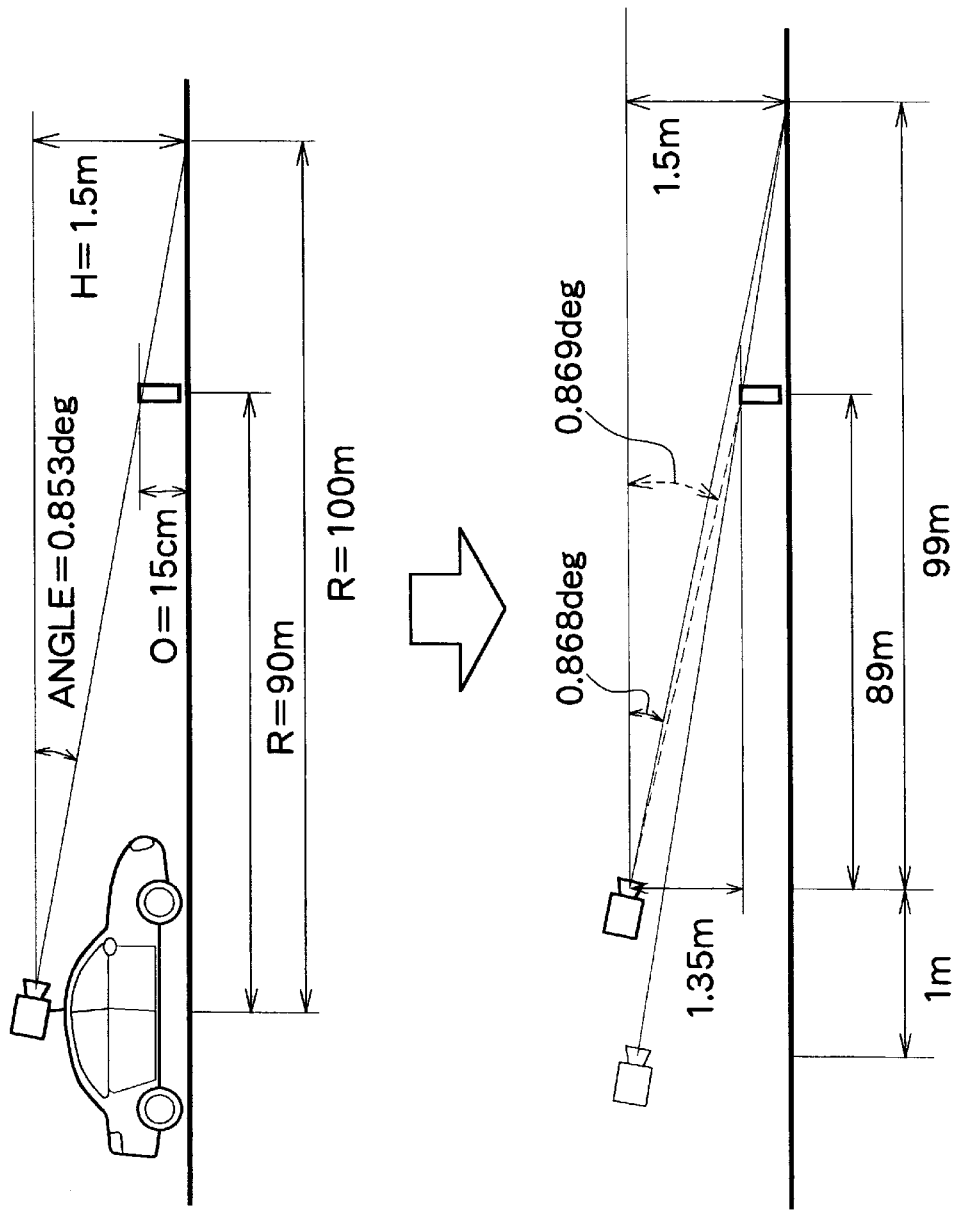
FIG. 1 is a diagram illustrating a problem in a conventional technique.
Figure 2:
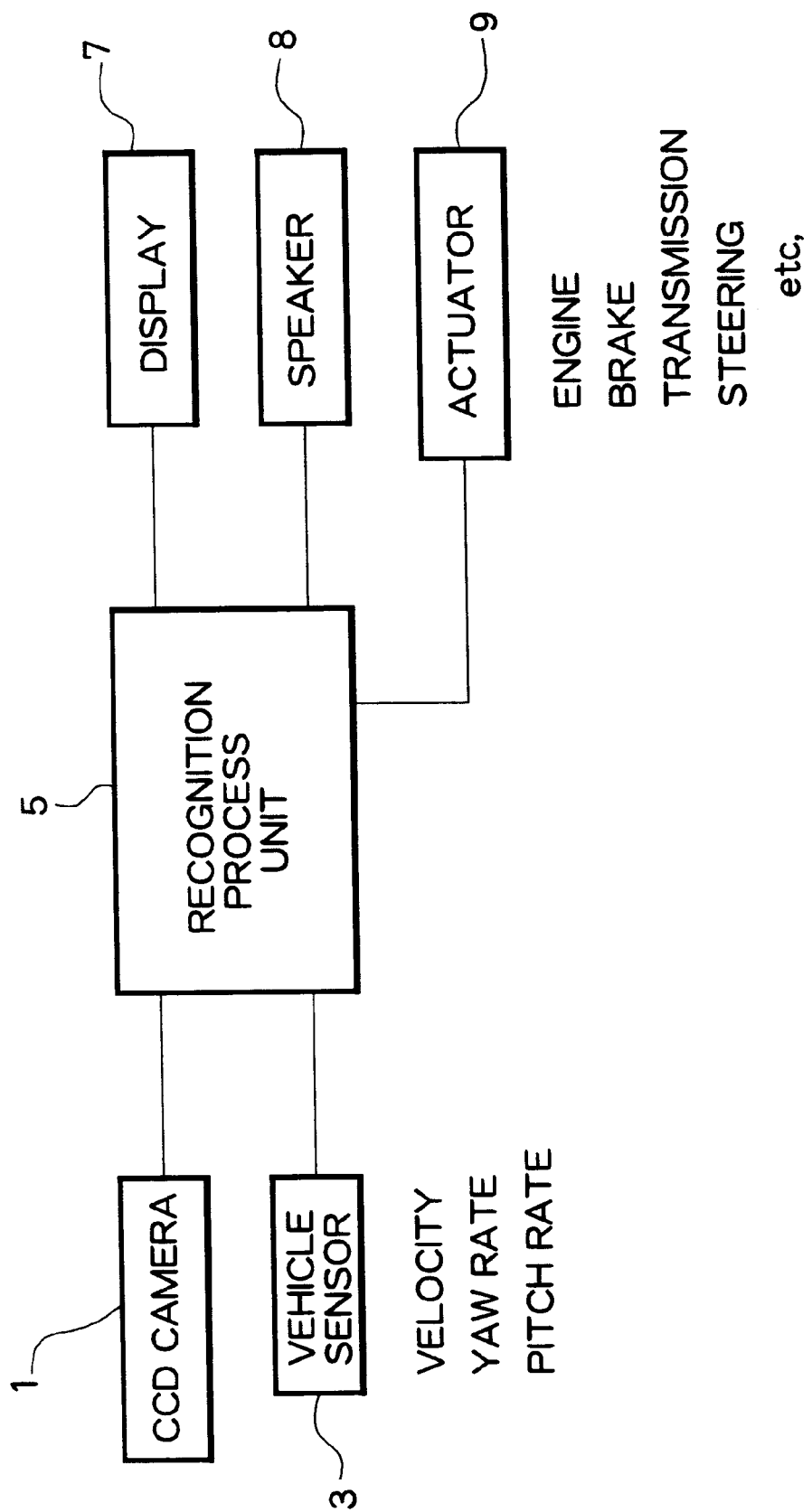
FIG. 2 is a block diagram showing a general configuration of an obstacle detection apparatus according to an embodiment of the present invention.

FIG. 2 is a block diagram showing a general configuration of the obstacle detection apparatus. A single CCD camera 1 is mounted on a vehicle. The CCD camera 1 photographs an area in front of the vehicle. The camera 1 is installed, for example, on the roof of the vehicle. Vehicle sensors 3 may include a velocity sensor, a yaw rate sensor, and a pitch sensor.

An image sequence (moving image) photographed by the CCD camera 1 during vehicle travel is transmitted to a recognition process unit 5. The recognition process unit 5 is a computer unit for detecting obstacles on the road surface through image processing. The detection result is output via a display 7 and a speaker 8 in the form of, for example, an alarm indicating presence of an obstacle. Information on an obstacle is used to control actuators 9. Actuators 9 may include an engine, brake, transmission, or steering device. Appropriate control may be performed to avoid obstacles.

Figure 3:
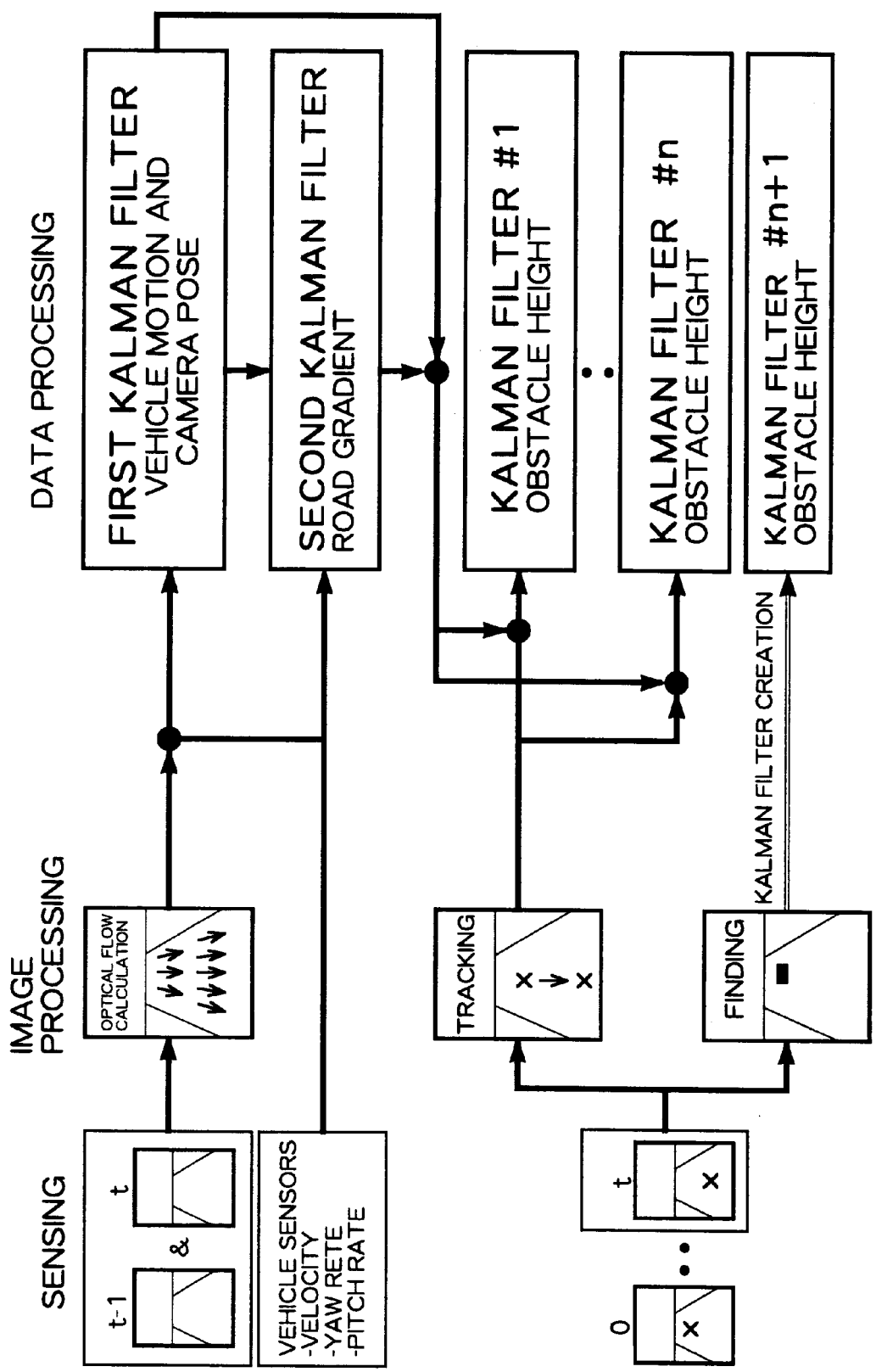
FIG. 3 is a diagram showing a configuration of the recognition process unit of FIG. 2.

FIG. 3 shows the configuration of the recognition process unit 5. The recognition process unit 5 mainly comprises a motion and pose determination section 11 and a recognition process section 13. The motion and pose determination section 11 determines the vehicle motion (camera motion) and camera pose, and additionally the road gradient. The recognition process section 13 identifies a possible obstacle in an image, tracks the possible obstacle through the image sequence, and detects the obstacle based on trajectory information obtained by the tracking. The track and recognition processing is performed accurately using motion and pose information and gradient information. In the present embodiment, for example, the height, distance, and lateral location of the obstacle are determined. Each of the processing stages are described below in detail.

Determination of Vehicle Motion and Camera Pose

FIGS. 4A–4C illustrate the general principle of the processing by the motion and pose determination section 11. An optical flow model can be generated from the two-dimensional photograph image of FIG. 4C. This model can be expressed using eight flow parameters of the well-known quadratic flow model. These parameters are combined with their position within the image. In this example, vectors connecting identical points in two images are identified while assuming that the road surface is planar.

In a three-dimensional space, on the other hand, the vehicle motion and camera pose (orientation and position) are expressed using nine physical parameters as shown in FIGS. 4A and 4B. The nine physical parameters are vehicle velocities in three directions a, b, c; angular velocities with respect to three axes W1, W2, W3; and camera pitch θ, roll φ, and height H.

By providing one of these nine physical parameters (such as camera height), the other eight physical parameters can be calculated using the optical flow parameters to determine the motion and pose. In the present example, this determination is performed using the Extended Kalman Filter to reduce noise.

A method conceived by the inventor of the present invention for determining vehicle motion and orientation based on optical flows is described below as a technique suitable for application in the present embodiment.

In the obstacle recognition described later, a possible object found in an image is tracked through the moving image. As the basis for precise recognition, it is desirable to accurately determine how the photographing side moved during the tracking. Two methods are possible for this purpose. One method is to accumulate the two-dimensional motion parameters in the image coordinates. The other method is to accumulate the three-dimensional motion parameters in the three-dimensional world coordinates.

A mathematical framework for calculating both of these parameters is proposed in "Hierarchical Model-Based Motion Estimation," J. Bergen, P. Anandan, K. Hanna and R. Hingorani, Proceedings 2nd European Conference on Computer Vision-92, Santa Margherita Ligure, Italy, May 1992, which is incorporated herein by reference. In this document, optimal calculation is performed to minimize intensity difference between the current image and the previous image (modified with the motion parameters).

However, the two-dimensional motion parameters in the image coordinates are data that are basically unsuitable for integral processing. Accumulation processing of these parameters is difficult in practice. Further, as physical dimensions cannot be set appropriately, shape information obtained from the accumulation results of these parameters is ambiguous. Recognition of physical shape (such as dimensions) is therefore difficult.

Considering the above problems, the inventor observed that it is most practical and effective to accumulate the motion parameters (ratio of change) in the three-dimensional coordinates. Using this method, the vehicle motion and orientation relative to the road plane can be determined concretely. This information is the basis for calculating the image change due to the camera motion and pose, and allows information accumulation for obstacle recognition in the three-dimensional world defined by the road plane. Further, such information can be used for vehicle control and road geography modeling.

In the present embodiment, motion and orientation in three-dimensional space is estimated from optical flow vectors based on the above discussion. As explained above, optical flow vectors are vectors connecting identical points in a plurality of images.

A difficulty in this estimating process is that the relationship between the flow vectors and the parameters is non-linear. Moreover, measurement noise in the image intensities and the effects due to the discrete nature of CCD cameras should be eliminated for accurate and stable estimation. As a specific example for coping with these requirements, the present embodiment uses the Extended Kalman Filter.

The Extended Kalman Filter is described in, for example, "Recursive 3-D Road and Relative Ego-State Recognition," E. Dickmanns and B. Mysliwetz, IEEE Transactions on Pattern Analysis and Machine Intelligence, Vol. 14, No. 2, February 1992, and "Robust car tracking using Kalman filtering and Bayesian templates," F. Dellaert and C. Thorpe, Proceedings of SPIE: Intelligent Transportation Systems, Vol. 3207, October 1997, which are incorporated herein by reference.

Figure 5:
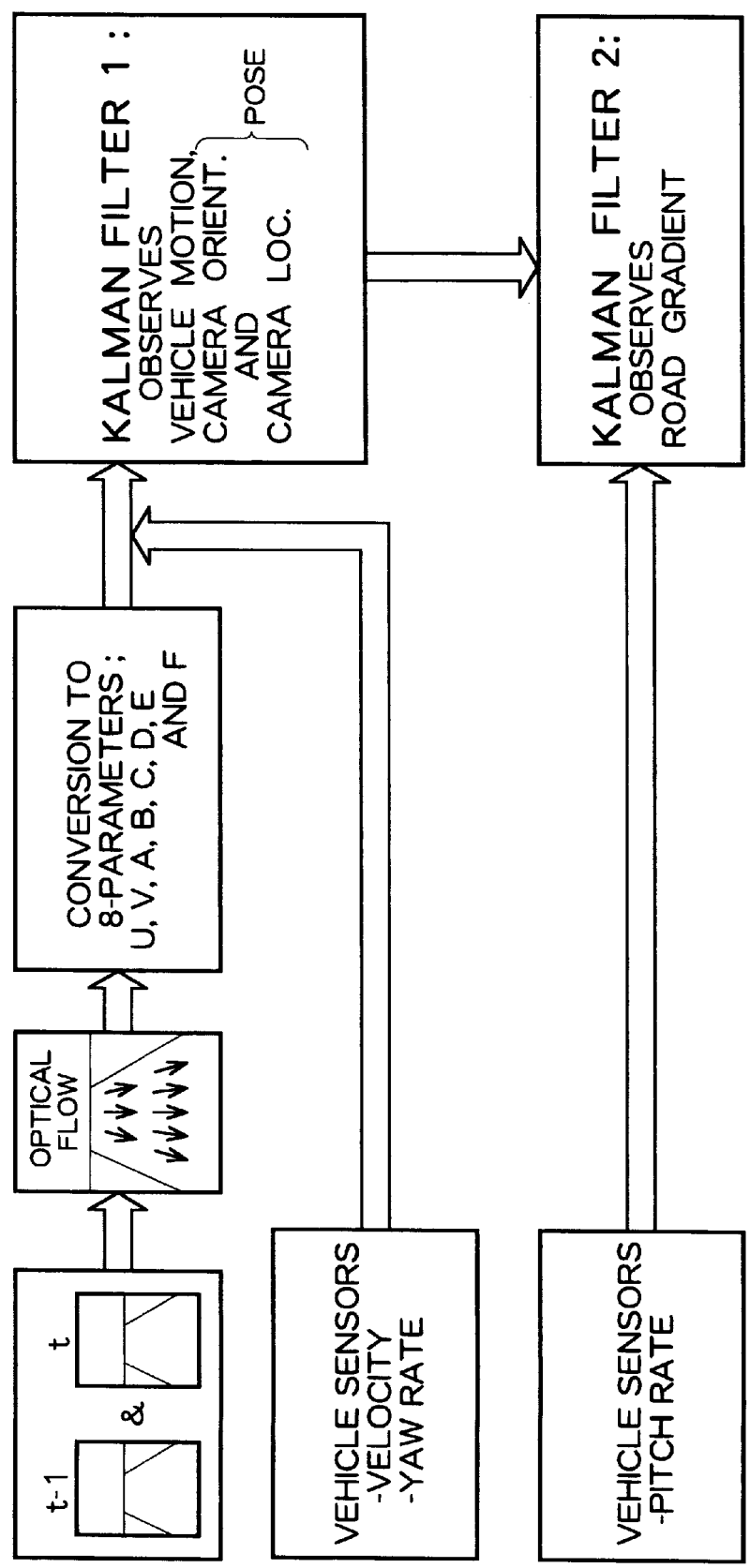
FIG. 5 is a diagram showing the motion and pose determination section of the recognition process unit in FIG. 3.

The schematic diagram of FIG. 5 corresponds to the upper half of FIG. 3. A plurality of images (for time t−1 and t, for example) photographed by a single CCD camera are input as sensor information. Vehicle sensors input vehicle velocity, yaw rate, and pitch rate. The yaw rate and pitch rate sensors may be those commonly installed on recent luxury-class passenger cars. The CCD camera may be mounted in the center of the vehicle roof rack.

In the configuration of FIG. 5, eight parameters of the optical flow and the two-dimensional flow model are calculated from the image information through image processing. The optical flow is processed using a Kalman Filter which serves as the data computing unit to calculate the vehicle motion and camera pose (orientation and location). Velocity and yaw rate are used together with image information to improve the accuracy of the estimate. A second Kalman Filter is provided, and the motion information from the first Kalman Filter and the pitch rate from the vehicle sensor are input to the second Kalman Filter. This second Kalman Filter is provided as a data computing unit for road gradient determination.

The principles of motion determination are described below in greater detail.

1) Definitions of Coordinate Systems and Parameters

Figure 6:
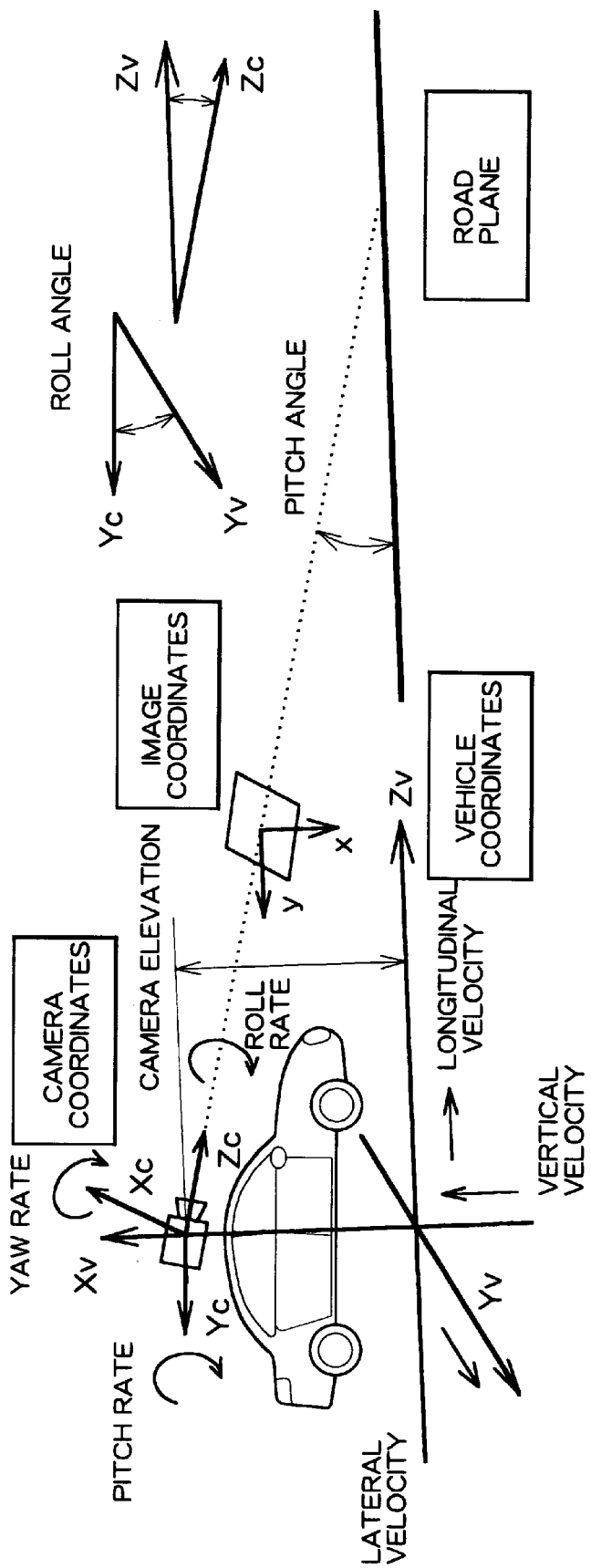
FIG. 6 is a diagram defining coordinate systems.
Figures 7A, 7B:
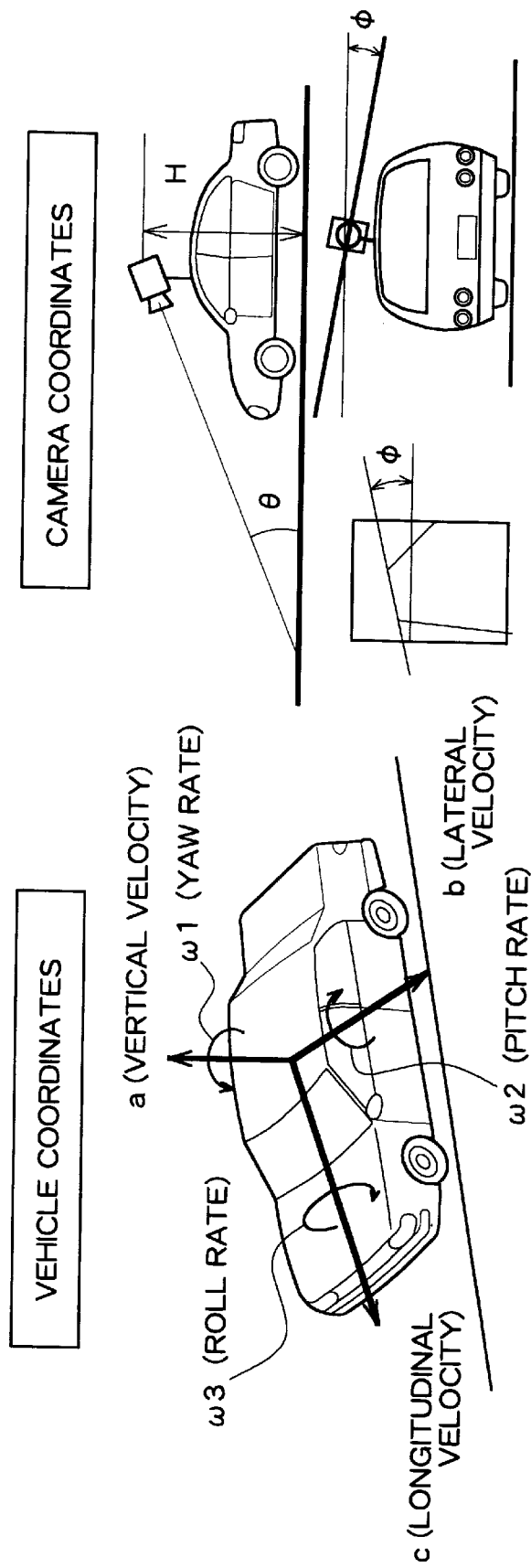
FIGS. 7A and 7B are diagrams showing vehicle and camera coordinates.

FIGS. 6 and 7 illustrate the three coordinate systems used in the present embodiment, namely, the image coordinate system, the camera coordinate system, and the vehicle coordinate system. The image coordinates are set up on the CCD image plane. In the camera coordinates, the origin is the point where the camera axis intersects the image plane. The vehicle coordinates are obtained by rotating the camera coordinates. These coordinate systems move along with the motion of the camera.

It is assumed that the road surface appearing in the images is basically planar. However, small irregularities and gradients actually exist. A preferred processing concerning this point will be described later.

2) Planar Surface Flow

The motion of the camera mounted on a vehicle traveling on the road has six degrees of freedom: vertical velocity $a_{camera}$, lateral velocity $b_{camera}$, longitudinal velocity $c_{camera}$, yaw rate $\omega_1$, pitch rate $\omega_2$, and roll rate $\omega_3$. These motion parameters are measured in terms of the camera coordinates.

Assuming that the road surface is planar, the plane equation is expressed in terms of the camera coordinates as follows:

$$Z_{camera} = p X_{camera} + q Y_{camera} + r \quad (1)$$

where p, q, and r are plane parameters.

The optical flow vectors generated by the images of the planar surface in the image plane are expressed as the following equations:

$$u = fU + Ax + By + 1/f(Ex+Fy)x \quad (2)$$

$$v = fV + Cx + Dy + 1/f(Ex+Fy)y \quad (3)$$

where u and v are horizontal and vertical components of flow vectors at image coordinates (x,y), respectively. f is a focal length. U, V, A, B, C, D, E, and F are flow parameters determined in terms of the camera motion and orientation with respect to the surface. The flow parameters are given as following equations:

$$y_{v,camera} = \begin{pmatrix} U \\ V \\ A \\ B \\ C \\ D \\ E \\ F \end{pmatrix} = \begin{pmatrix} -a_{camera}td/r - w_2 td \\ b_{camera}td/r + w_1 td \\ (pa_{camera}td + c_{camera}td)/r \\ qa_{camera}td/r + w_3 td \\ pb_{camera}td/r - w_3 td \\ (qb_{camera}td + c_{camera}td)/r \\ -pc_{camera}td/r - w_2 td \\ -qc_{camera}td/r + w_1 td \end{pmatrix} \quad (4)$$

where td is image sampling time.

The plane parameters can be described with the camera orientation angles and position with respect to the road plane, that is, pitch angle $\theta$, roll angle $\phi$, and camera height H. In general, $\theta$, $\phi$, and $\Delta H$ (change in H) are approximately equal to zero in most vehicles. Therefore:

$$\sin(\theta) \approx \theta$$

$$\sin(\phi) \approx \phi$$

$$1/(H+\Delta H) \approx (1/H)(1-\Delta H/H)$$

Using the above approximations, the following equations are derived from the geometrical relationship between the camera and the road plane.

$$p \approx -1/\theta$$

$$q \approx \phi/\theta$$

$$r \approx H/\theta$$

$$1/H \approx (1/H_0)(1-\Delta H/H_0)$$

As shown in FIG. 7, the camera coordinates are rotated by θ and φ with respect to the vehicle coordinates. Accordingly, the camera translational velocities $a_{camera}$, $b_{camera}$, and $c_{camera}$ can be written as follows in terms of the vehicle translational velocities a, b, and c.

$$\begin{pmatrix} a_{camera} \\ b_{camera} \\ c_{camera} \end{pmatrix} \simeq \begin{pmatrix} 1 & -\phi & \theta \\ \phi+\gamma\theta & 1-\gamma\theta\phi & -\gamma \\ \gamma\phi-\theta & \gamma+\theta\phi & 1 \end{pmatrix}^T \begin{pmatrix} a \\ b \\ c \end{pmatrix} \quad (5)$$

$$= \begin{pmatrix} a+b\phi-c\theta \\ -a\phi+b+c\gamma \\ a\theta-b\gamma+c \end{pmatrix}$$

When installing a camera, it is difficult to exactly match the camera axis with the vehicle's direction of travel at the neutral steering position. The parameter γ is therefore introduced to account for the difference in the horizontal directions between the camera and the vehicle. The horizontal difference is used to measure the longitudinal velocities of the camera and the vehicle.

In accordance with the above, the flow vectors are given in terms of the vehicle coordinates as below.

$$y_v = h_v = (U \quad V \quad A \quad B \quad C \quad D \quad E \quad F)^T \quad (6)$$

$$\approx \begin{pmatrix} \frac{-(a+b\phi-c\theta)\theta td(H_0-\Delta H)}{H_0^2} - w_2 td \\ \frac{-(-a\phi+b+c\gamma)\theta td(H_0-\Delta H)}{H_0^2} + w_1 td \\ \frac{(-(a+b\phi-c\theta)+(a\theta-b\gamma+c)\theta td(H_0-\Delta H)}{H_0^2} \\ \frac{(a+b\phi-c\theta)\phi td(H_0-\Delta H)}{H_0^2} + w_3 td \\ \frac{-(-a\phi+b+c\gamma)td(H_0-\Delta H)}{H_0^2} - w_3 td \\ \frac{((-a\phi+b+c\gamma)\phi+(a\theta-b\gamma+c)\theta)td(H_0-\Delta H)}{H_0^2} \\ \frac{(a\theta-b\gamma+c)td(H_0-\Delta H)}{H_0^2} - w_2 td \\ \frac{-(a\theta-b\gamma+c)\phi td(H_0-\Delta H)}{H_0^2} + w_1 td \end{pmatrix}$$

3) Vehicle Dynamics Model

As previously mentioned, the Extended Kalman Filter is used in the present embodiment to reduce the measurement noise and to facilitate handling of non-linear equations. The Extended Kalman Filter is, as is known, a Kalman Filter configured to perform non-linear processing. In the present embodiment, a mathematical model of the physical structure of the concerned vehicle is provided inside the Filter. An example of the vehicle dynamics model which uses the Extended Kalman Filter is described below.

The vehicle dynamics (heave, pitch, and roll motions) can be modeled as a second-order oscillatory motion. Such model may be expressed by ten equations including equations for three translational velocities and three rotational velocities on the vehicle coordinates with respect to the center of gravity, three equations for camera pose in terms of camera view with respect to the road plane, and an equation for the angular difference between the camera axis and the vehicle axis.

The vertical motion is:

$$\dot{a}+p_a a+q_a \Delta H=k_a \alpha+W_a \quad (7)$$

$$W_a = p_a \dot{h}_a + q_a h_a$$

where $p_a$ is a damping coefficient, $q_a$ is a spring coefficient, $k_a$ is the relation factor between acceleration and height change, α is a vehicle acceleration induced by the driver or the road gradient, $W_a$ is a process noise from road bumps, and $h_a$ is the road bumps. (The same alphabets indicate the same items in the following equations.)

The pitching motion is:

$$\dot{\omega}_2+p_\theta \omega_2+q_\theta \theta=(k_\theta/I_\theta)\alpha+q_\theta \theta_0 30 \; W_2 \quad (8)$$

$$W_2 = p_\theta \dot{h}_\theta + p_\theta h_\theta$$

where $I_\theta$ is the inertial moment of pitching, $\theta_0$ is the initial pitch angle, $p_\theta$ is the damping coefficient, $q_\theta$ is the spring coefficient, $k_\theta$ is the relation factor between α and the ratio of $\omega_2$ change, $W_2$ is the process noise from road bumps, and $h_\theta$ is the equivalent pitch change due to $W_2$ in quadratic dynamics.

The rolling motion is:

$$\dot{\omega}_3+p_\phi \omega_3+q_\phi \phi=(k_\phi V/I_\phi)\sin\omega_1+q_\phi \phi_0+W_3 \quad (9)$$

$$W_3 = p_\phi \dot{h}_\phi + q_\phi h_\phi$$

where V is the vehicle velocity, $I_\phi$ is the inertial moment of roll, $\phi_0$ is the initial roll angle, $p_\phi$ is the damping coefficient, $q_\phi$ is the spring coefficient, $k_\phi$ is the relation factor between acceleration of travel and the ratio of $\omega_3$ change, $W_3$ is the process noise from road bumps, and $h_\phi$ is the equivalent roll change due to $W_3$ in quadratic dynamics.

Assuming that the vehicle slip angle is negligible, the lateral motion is:

$$\dot{b}=W_b \quad (10)$$

where $W_b$ is the process noise due to the head (vehicle front) angle difference, wind-up, and road bumps.

The longitudinal motion is:

$$\dot{c}\alpha+W_c \quad (11)$$

where $W_c$ is the process noise due to road gradient.

The yaw motion is:

$$\dot{\omega}_1=W_1 \quad (12)$$

where $W_1$ is the process noise due to road bumps.

The following are the pitch angle and roll angle at the camera axis according to the camera view with respect to the road plane, and the initial camera position height relative to the road plane.

$$d\theta/dt=\theta=\dot{w}_2$$

$$d\phi/dt=\phi=\dot{w}_3$$

$$d(\Delta H)/dt=\Delta \dot{H}=a$$

In addition, regarding camera angles, the angle between the camera orientation and the vehicle orientation, and the angle between the vehicle orientation and the vehicle travel can also be considered. The former of these angles corresponds to the previously mentioned γ. For the latter, an appropriate estimate value can be used favorably. This angle may be treated by assuming b=0, supposing a state wherein the vehicle velocity is not large or a state other than a travel along a tight curve.

Various conditions concerning the vehicle dynamic model were explained above. These conditions, i.e., the six motion parameters and the four orientation parameters, are written in the form of a linear matrix expression in the Extended Kalman Filter.

4) Calculation of Optical Flow and Flow Parameters

Initially, the Laplacian Gaussian Filter is applied to enhance image features. A template matching method is then used to calculate optical flow parameters. The sum of absolute differences can be used as the matching index in the template matching method.

The previous optical flow vectors are used to set appropriate starting positions for the template matching. At initialization, it is assumed that there are no obstacles in the road region. By this assumption, the calculation of the optical flow vectors can be performed in real time operation without imposing a large computational load.

The above-mentioned, equations (2) and (3) are used to calculate the flow parameters of the road surface, U, V, A, B, C, D, E, and F. The Least Mean Square Method is used to calculate flow vectors and their positions in image coordinates (u(x,y), v(x,y), x, y). This process is repeated for a few iterations to remove outliers.

5) Implementation of Extended Kalman Filter

In the present embodiment, the vehicle velocity and the yaw rate given by the vehicle sensors are used together with the eight parameters calculated from the optical flow patterns. The observation vector yv of the vehicle motion can therefore be defined as follows:

$$y_v = (UVABCDEFc\omega_1)^T \quad (13)$$

where c and $\omega_1$ are measured values of vehicle sensors (the velocity sensor and the yaw rate sensor, respectively).

The state vector zv to be estimated in the present embodiment is composed of six parameters of the vehicle motion, the three parameters of the vehicle orientation, and the offset angle between the camera axis and the vehicle axis, as below.

$$\hat{z}_v = (\hat{a}\hat{b}\hat{c}\hat{\omega}_1\hat{\omega}_2\hat{\omega}_3\hat{\theta}\hat{\phi}\Delta\hat{H}\hat{\gamma})^T \quad (14)$$

The observation vector is non-linear in the variable states as expressed in equation (6). The Extended Kalman Filter provides minimum-variance estimates by linearizing system equations in terms of the previous estimates. As the co-variance matrices and the Kalman gain of the Extended Kalman Filter depend on the current measurements, these are updated at every iteration using the latest sensor data and estimates.

6) Experimental Results

In this example, the algorithm for estimating the vehicle motion and orientation was implemented using the SIMULINK module of MATLAB version 5 in an SGI O2 workstation (each of these names is a trademark). The input data were a sequence of images photographed by a single CCD camera and the vehicle sensor data. These data were gathered simultaneously from a passenger car driving in a parking lot.

The image size used was 256×240 pixels and the image grabbing rate was 15 Hz (15 frames per second). The image sequence was photographed while traveling at a speed of approximately 24 km/h.

Figure 8A:
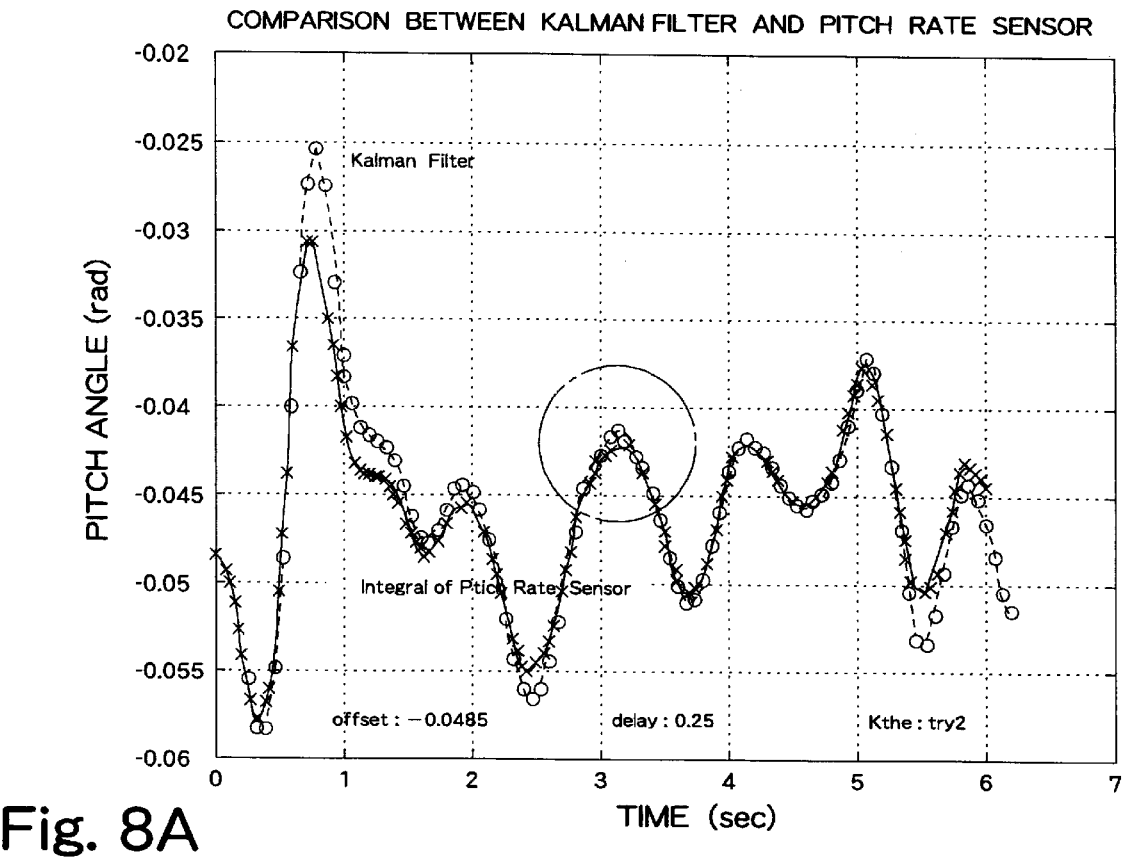
FIGS. 8A and 8B are diagrams showing results of pitch angle estimation which serve as motion information.
Figure 8B:
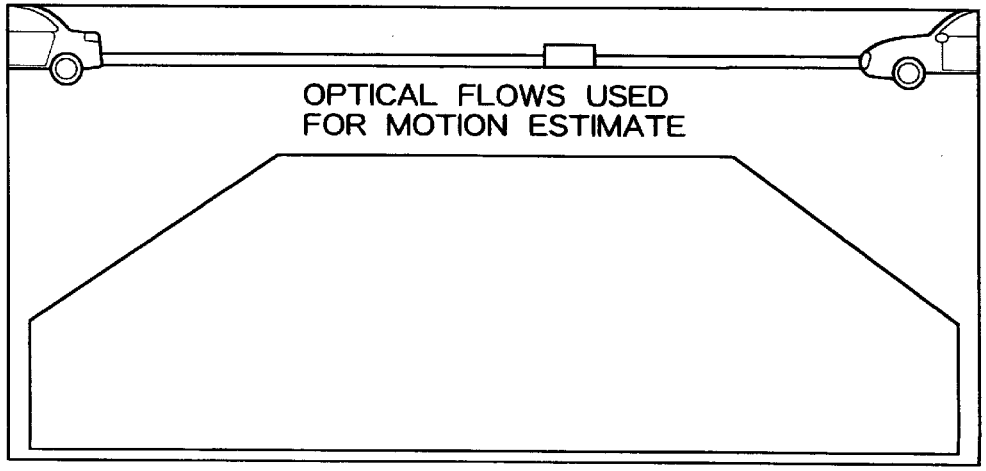

The graph of FIG. 8A shows a comparison between the pitch angle estimated by the Extended Kalman Filter (shown by the dashed line) and the pitch angle measured by the sensor (shown by the solid line). One unit of the vertical scale is approximately 0.25 degrees, while a unit of the horizontal scale is 1 second. The image of FIG. 8B is an LOG-filtered frame from the image sequence. The two lines resulting from estimation and measurement match favorably, which demonstrates that this estimation processing is accurate and stable.

Figure 9A:
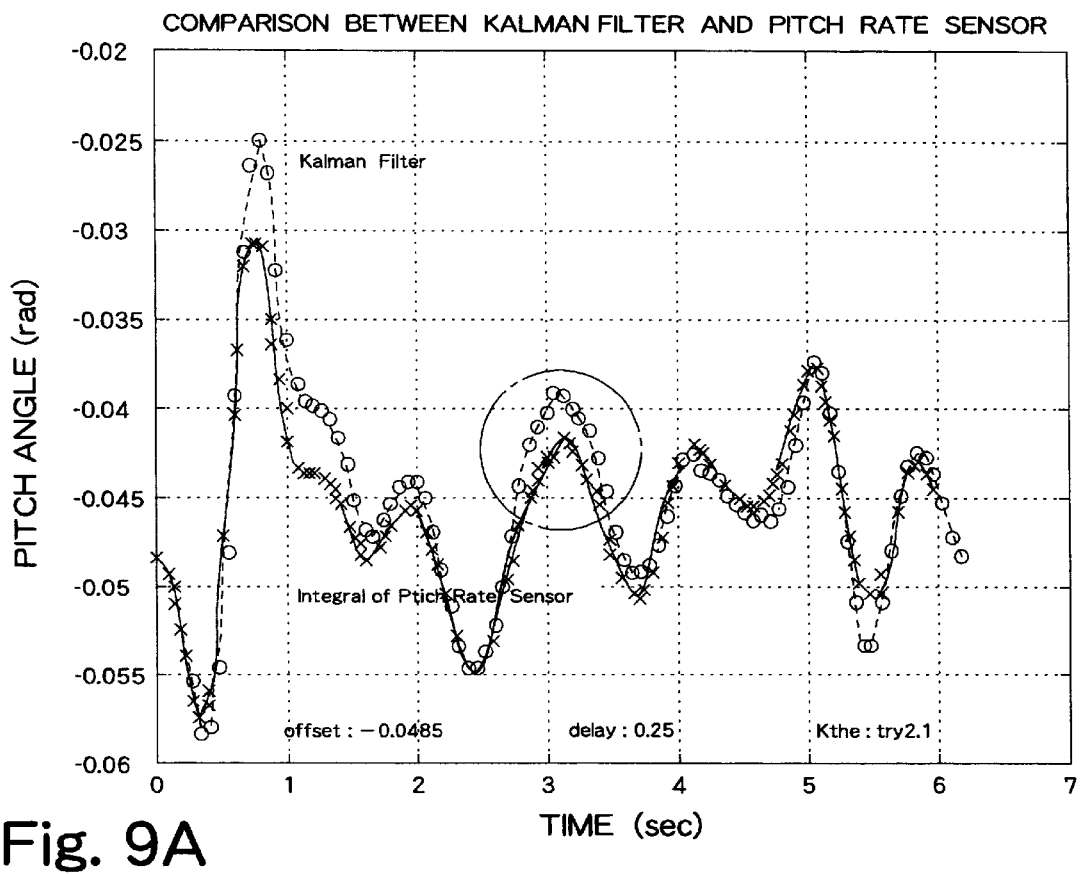
FIGS. 9A and 9B are diagrams showing results of pitch angle estimation when the processed region differs from FIG. 8.
Figure 9B:
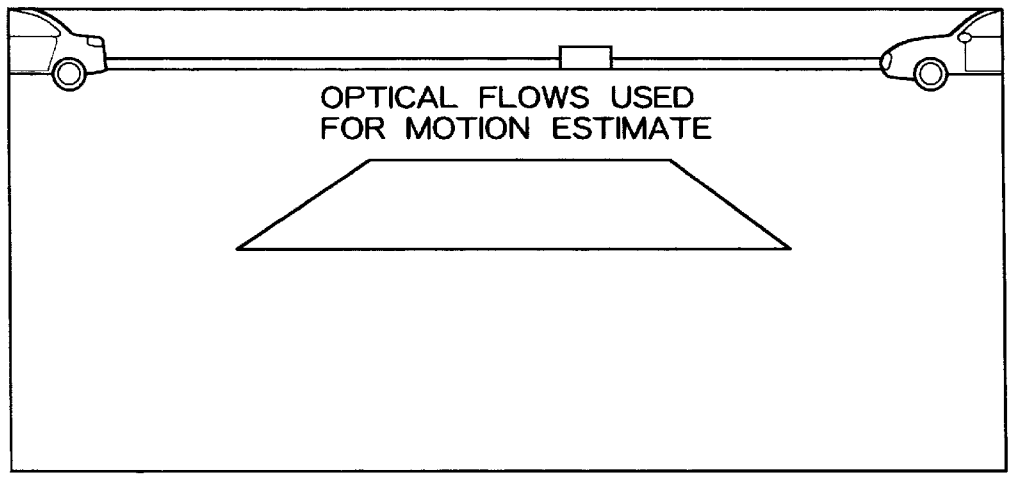
Figure 10A:
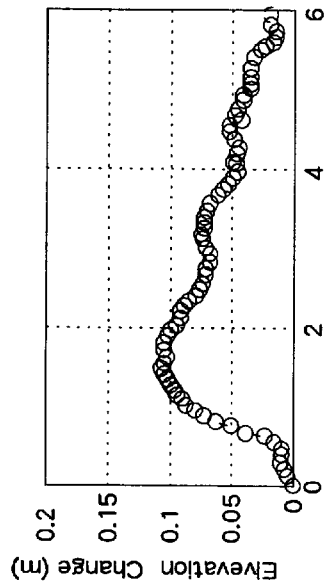
FIGS. 10A–10F show estimate results of various motion and pose parameters.
Figure 10B:
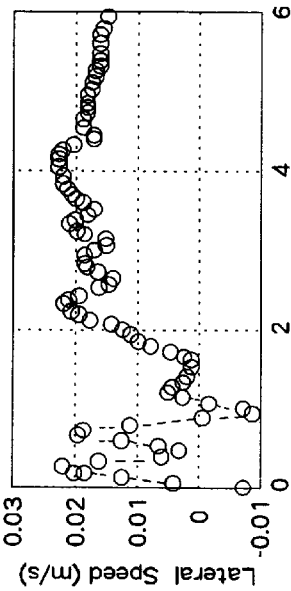
Figure 10C:
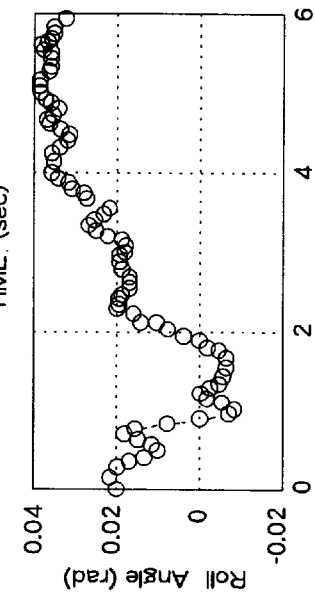
Figure 10D:
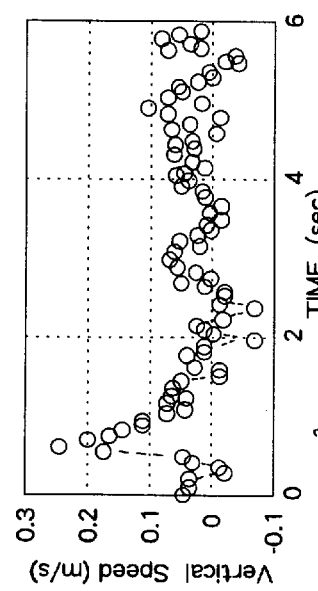
Figure 10E:
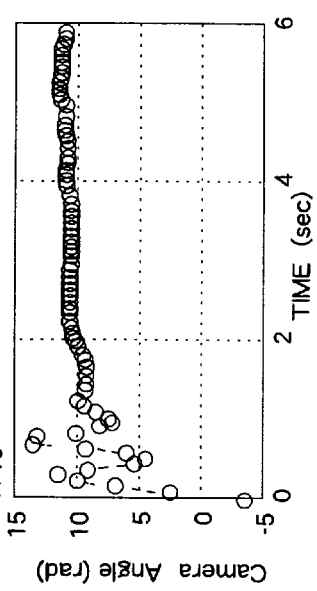
Figure 10F:
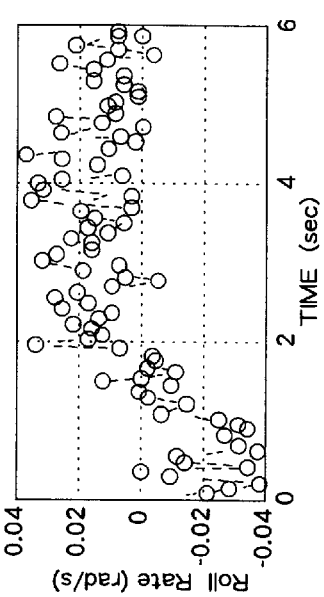

When the region for the determination processing is made smaller and the number of optical flow vectors used for the motion estimation is reduced as shown in FIG. 9, the stability does not change but the degree of the match between estimation and measurement reduces slightly. This effect is apparent in the circled portions in FIGS. 8A and 9A.

The cause of this difference is considered to be the difference between the road gradients in the two processed sections selected for each processing (a large section and a small section). In fact, the Extended Kalman Filter estimates the orientation of the camera axis relative to the road surface, while the pitch rate sensor measures the absolute pitching motion of the camera.

FIG. 10 shows the estimated results of other various vehicle motion parameters. The estimated values shown are considered to be in favorable agreement with the values given by other measurement methods. Note that the graph labeled "camera angle" indicates the offset angle (between the vehicle longitudinal axis and the camera axis).

In the above, the algorithm for estimating vehicle motion and orientation with optical flow was described. Referring again to FIG. 3, implementation of the above algorithm in the obstacle detection apparatus of the present embodiment will next be explained.

When a plurality of images photographed at separate timings are input, optical flow is calculated from those images using the above-described method, thereby generating flow parameters. These flow parameters along with the velocity and yaw rate obtained from the vehicle sensors are input to the first Kalman Filter configured according to the above-described principles. The above-explained parameter conversion is performed to yield the vehicle (camera) motion and the camera pose.

A pitch angle estimated by the first Kalman Filter is input in the second Kalman Filter. A pitch rate from the vehicle sensor is also input in the second Kalman Filter as the measured pitch angle information. Using the estimated pitch angle and the measured pitch angle, the second Kalman Filter determines the road gradient.

The principle of gradient detection is as follows. The estimated pitch angle includes road gradient information in addition to the actual pitch angle. The measured pitch angle, on the other hand, only includes the actual pitch angle. The road gradient can therefore be determined from the difference between the estimated and the measured pitch angles.

The data estimated in the motion and pose determination section 11 are transmitted to the recognition process section 13.

Obstacle Recognition

An obstacle recognition example of the preferred embodiment will next be described.

The vehicle motion and the camera pose were determined through the above-described processing. Regarding road geography information, any point on the road can be described with the road coordinates. Road coordinates are defined as the YZ plane tangent to the road where the vehicle is placed at a desired initial time. Although the road geography can be precisely determined, whether or not a point in an image is truly located on the road can only be determined with much ambiguity when using a single image. This is because a point located closer to the camera and above the road are projected on the same pixel position on the image plane as a point which is located slightly further on the road. The present embodiment therefore tracks a possible obstacle over a suitable time period, such as a few seconds, to reliably perform recognition.

In general, the trajectory of the concerned point in the image plane can be described based on the vehicle (camera) movement from the initial position to a current position in the road coordinates, and the positions of the point in the camera coordinates. The vehicle movement is common to all points in the image and is easily calculated by accumulation of the vehicle motion (rate of change). When the three-dimensional movement of the vehicle and the trajectory of the image are available, the three-dimensional position of the point in terms of the camera coordinates can be calculated. In order to process data that are non-linear and closely related, and to eliminate noise, the Extended Kalman Filter is again used favorably in this processing. The recognition processing is explained below in detail.

The recognition processing is performed in the recognition process section 13 in FIG. 3 by referring to the above-described motion and pose and based on the captured images. The principle of the recognition processing will next be explained in reference to FIG. 11. In this example, the height of an obstacle is determined. If any object protruding from the road surface exists, that object is regarded as an obstacle.

Figure 11:
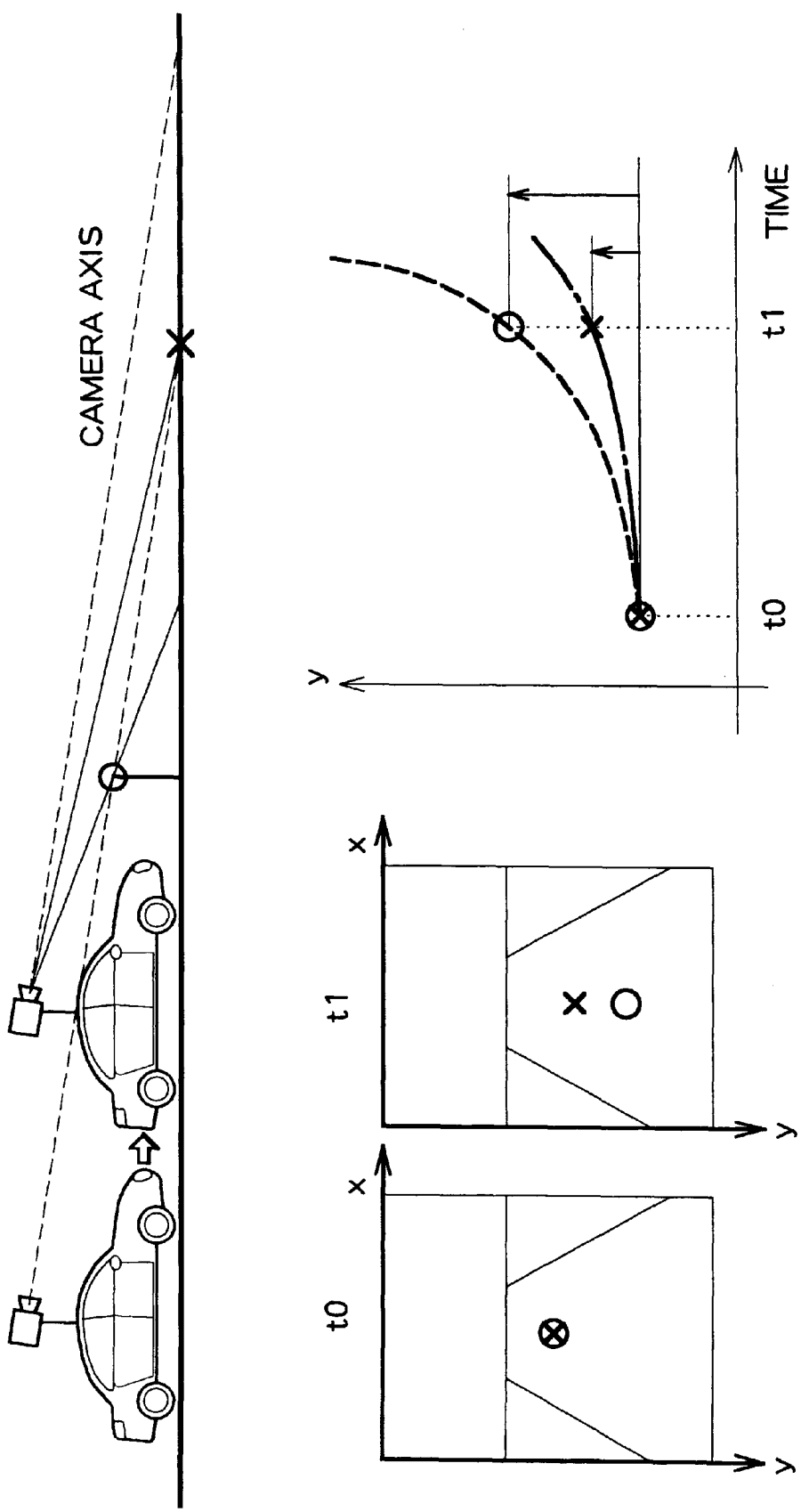
FIG. 11 is a diagram illustrating the principle of the obstacle recognition processing using tracking according to the present embodiment.

In FIG. 11, it is assumed that a possible obstacle is detected in the image of t0. A possible object may comprise a portion differing from the road surface in image intensity. Characteristic points, such as edges, of such a portion are identified as possible obstacle points.

Tracking of the possible obstacle is begun at t0. The image capture rate may, for example, be 15 frames/second. A plurality of frames are captured over a suitable time period (from t0 to t1) which may be a few seconds, and the possible obstacle is tracked within those frames. The possible obstacle points indicate different trajectories according to their height from the road surface, i.e., according to whether or not the possible points are actually a part of an obstacle.

In the graph of FIG. 11, the circle indicates the trajectory when a possible point is located above the road surface, while the X indicates the trajectory when the possible point is located on the road surface (height 0). The circle moves within the images by a larger amount.

Accordingly, the present embodiment determines an obstacle based on the trajectory difference between the possible points. When a possible point is located higher than the road surface, it is determined that an obstacle is located at the position of the possible point. In this example, any scheme should be sufficiently used as long as the difference between the two trajectories of FIG. 11 can be determined. Such difference is typically determined from the point movement amount. It is possible to base the determination on the speed of movement (corresponding to the gradient of the trajectory) of the possible point. During determination of an object height information, it is within the scope of the present invention to simply determine the presence of an actual height above the road surface. Preferably, a concrete value such as the height dimension of the object is calculated. The distance to the object and the lateral location of the object can be calculated as desired.

Note that, in the example of FIG. 11, it is presumed that the road gradient may vary but that locally the road surface is nearly planar. Regarding the vehicle motion, pitch, yaw, and roll is assumed to be small but not zero.

Figure 12B:
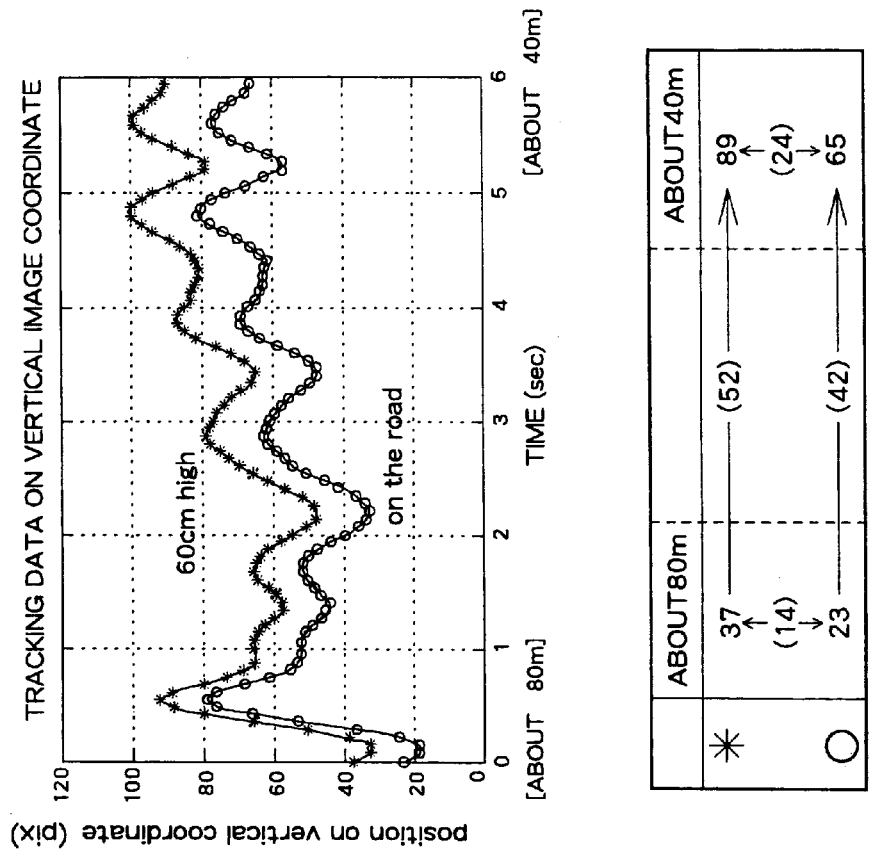
FIGS. 12A and 12B illustrate a method for applying camera motion and pose information to the processing of FIG. 11.

Use of the motion and pose information in the recognition processing is described next referring to FIG. 12. The graph of FIG. 12B illustrates the trajectories of points actually displayed in the images. It can be seen from this graph that a substantial difference exists between an uppermost point of an obstacle and a point on the road surface in the amount of their vertical movement within the images between the start and the end of the tracking.

As apparent from FIG. 12, it is unlikely that a point in the actual images moves constantly in one direction to create a smooth trajectory because the parameters such as height, yaw, roll, and pitch vary during the tracking.

Again referring to FIG. 12, the uppermost point of the obstacle and the point on the road surface demonstrate similar changes in vertical coordinates because the effect of the vehicle motion is similarly reflected in the entire image.

In light of the above situation, the present embodiment performs obstacle recognition based on the vehicle motion and camera pose. In principle, components of the motion and pose should be eliminated from the trajectories of FIG. 12B. This processing takes into account the movement amount calculated by integrating the motion estimated in accordance with the pose. By this processing, the three-dimensional position of a concerned point in terms of camera coordinates can be calculated.

Figure 12A:
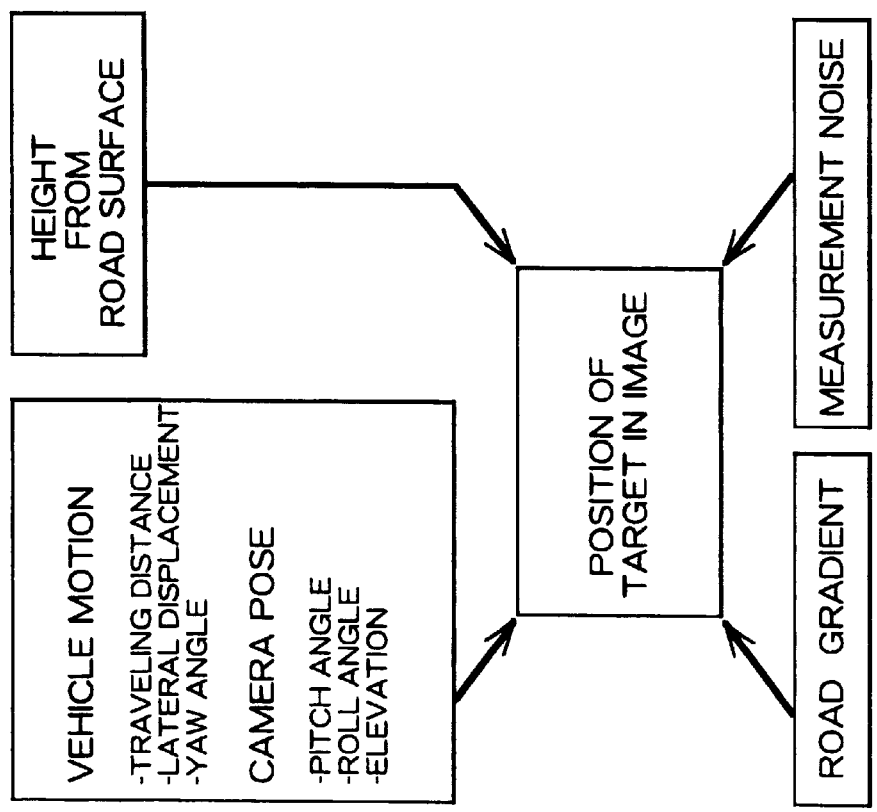

In the recognition processing illustrated in FIG. 12A, the traveling distance, lateral displacement, and yaw angle are determined as the vehicle motion. As the camera pose, the pitch angle, roll angle, and height are determined. The height information from the road surface is obtained, and the road gradient is calculated. The information on the position of the obstacle in the images is generated using these information.

The recognition processing receives influences of the measurement noise. As each of the parameters handled in the recognition processing relates to one another non-linearly and closely, the recognition processing is sensitive to measurement noise and is complex. The present invention overcomes this problem by using the Extended Kalman Filter as the processor for recognition processing.

Referring again to FIG. 3, the implementation of the above recognition processing in the obstacle detection apparatus of the present embodiment will now be explained. In the present embodiment, the recognition process section 13 is provided with a plurality of Kalman Filters for obstacle detection. These Kalman Filters are used to simultaneously perform recognition processing for a plurality of possible objects.

The Kalman Filters for obstacle detection are configured such that, under control of a controller (not shown), they can be individually activated at desired timings and their function can be similarly terminated at desired timings. The Kalman Filters may be generated by software executed in a processor.

The images input in the recognition process section 13 are used for tracking a possible object and for detecting new possible objects. Each of the Kalman Filters for tracking is assigned with a possible obstacle to be tracked. At the present, n number of Kalman Filters are in operation. Each Kalman Filter sequentially receives the vehicle motion and pose data (rate of change). By accumulating these data, how the camera moved (accumulated motion) during the tracking period is calculated using the accumulated data, the recognition processing is performed for a possible obstacle to determine whether or not the possible obstacle actually possesses a height that protrudes from the road surface thereby detecting an obstacle.

When a n+1th new possible object is found, a new Kalman Filter is created for that new possible object. As previously mentioned, a portion in an image that differs from the road surface in intensity may be selected as a new possible obstacle. The characteristic points in the image such as edges are favorably selected to start the tracking of the new possible obstacle.

When a possible obstacle is determined as not being a real obstacle, the Kalman Filter which has been processing that possible obstacle is terminated.

Figure 13:
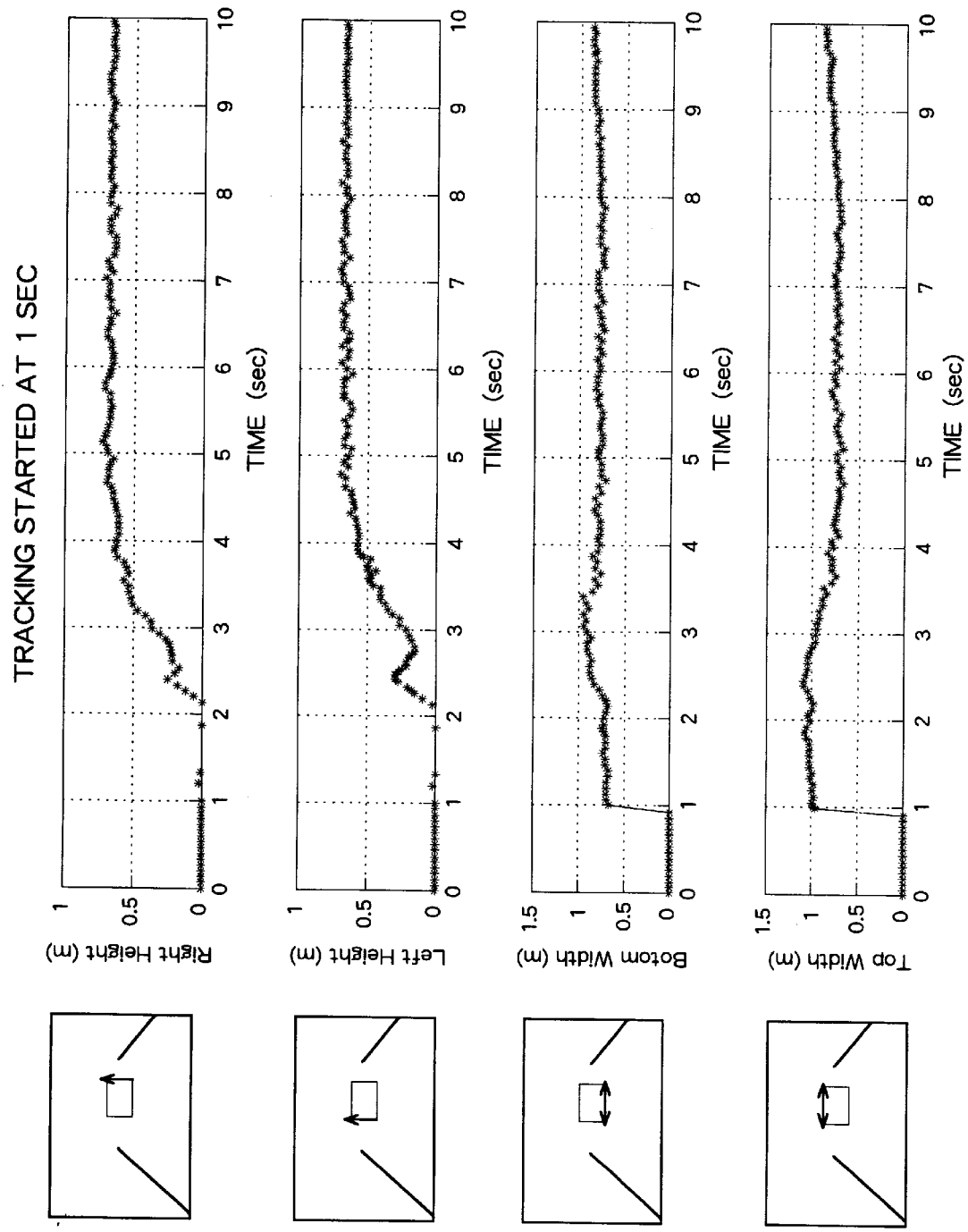
FIG. 13 is a diagram showing an example result of obstacle recognition.

FIG. 13 shows an example recognition result according to the present embodiment. Indicated from the top are estimated results of height, distance, and lateral position. Each of the graphs illustrates the recognition result for the uppermost point and the lowermost point (namely, a point on the road surface) of the possible object. The bottom graph shows the estimation of the road gradient.

The tracking was started at 1 second in the graphs. As can be seen, it is impossible to distinguish the uppermost point of the obstacle from the point on the road surface immediately after the start of the tracking. However, after a few seconds of the tracking, it is apparent that the uppermost point of the obstacle is located above the road surface. The estimate values converge and stabilize, allowing determination of the object height.

As described above, the present embodiment tracks a possible obstacle found in a plurality of images over a suitable time period. Accordingly, even when the obstacle is small, a large difference is detectable between the movements of a point on the obstacle and a point on the road surface. Further, through tracking, the corresponding possible obstacle points can be accurately identified in a plurality of images. This advantage is notable especially in contrast to a case wherein only two images obtained at a large time interval apart are compared. The present embodiment can thus accurately detects small obstacles.

In addition, the present invention can be effective even when the colors of the road surface and the obstacle are similar, i.e., when the difference between their image intensities is small, as explained below. (The influence of photography conditions can be reduced.)

It is assumed that a section A having a slightly different image intensity from the road surface is present in the road surface. In the present embodiment, the reference value used to judge whether to set this section A as a possible obstacle is lowered. Specifically, the reference value is assigned with a small intensity difference sufficient for suspecting section A of being an obstacle (small to a degree such that a section with a low possibility of being an obstacle is suspected).

When the intensity difference between the road surface and section A is more than the reference value, section A is identified as a possible obstacle, and the characteristic points such as the edges of section A are tracked. As a result of tracking, if the height of section A is identical with the road surface, section A is judged as not an obstacle. If, on the other hand, section A protrudes from the road surface, section A is determined an actual obstacle.

In this way, the range to be identified as possible obstacles is set widely in the present embodiment. Even when a section has a low possibility of being an obstacle, that section is provisionally identified as a possible obstacle. It is later determined whether or not the identification was correct. Obstacles can be detected even when the intensity difference between the obstacle and the road surface is small, thereby enhancing recognition capability.

To further improve the height determination accuracy, it is preferable to calculate the difference between the uppermost and the lowermost points in the possible object. For simplification, pixel positions may be processed only in terms of the vertical axis. However, for detailed processing, pixel positions in terms of the lateral axis in addition to the vertical axis should be taken into account. The same applies in the calculation of values other than height.

Referring again to FIG. 13, based on the fact that the actual height of the obstacle is 60 cm, it can be seen that the measured value exhibits some error. This error is considered to be caused by the road gradient change between the vehicle and the object. For improved accuracy, the position of the uppermost and the lowermost portions of the object may be calculated to determine the distance between the two.

While the description of the obstacle recognition apparatus a of a preferred embodiment of the present invention is set forth above using certain examples, the present invention is not limited to these examples. Those skilled in the art may modify and adopt the above embodiment within the scope of the present invention, or may implement the present invention in a different form.

Specifically, while obstacle detection apparatus is described in one preferred embodiment of the environment recognition apparatus of the present invention, the present invention may be implemented in an environment recognition device used for purposes other than obstacle detection. The present invention may be adopted for environment recognition by treating desired objects surrounding a vehicle as obstacles.

In the preferred embodiment, primarily the object height is detected as an example of information associated with the object shape. However, as previously mentioned, information other than height, such as any information related to three-dimensional shape, may be determined.

Irregularities in the road can also be detected by adopting the present embodiment. Preferably, the photograph images are divided into a plurality of sections. With respect to each of the divided sections, depth information is determined by performing the recognition processing of the present invention. That is, each divided section is treated as a possible object. When a depth difference is present between the sections, it is determined that irregularities are present. Bumps or dips due to ongoing construction may be detected, for example. As with the obstacle information, the irregularities information are output through a speaker or a display or used for control of actuators such as the steering devices. Such an environment recognition device for detecting irregularities is one preferred embodiment of the present invention.

It is possible to create a three-dimensional map using the environment recognition method of the present invention. Using the above-described embodiment, road geometry and buildings along the road are identified as obstacles to calculate their shapes. Shape information obtained in this way can be used for creating a map.

Another aspect of the present invention is an environment recognition apparatus used other than a vehicle. The camera can be installed on a desired moving structure, and objects can be recognized from the photographed images.

In the present invention, the camera is required to move only with respect to the object. The camera may be fixed while the object moves. Accordingly, the present invention may also be implemented in a monitoring or surveillance camera.

Further, as both the camera and the object may move in the present invention, the present invention may be used for detecting a vehicle traveling ahead.

In the above-described embodiment, the camera motion and pose determination function using photographed images was provided as one component comprising the environment recognition apparatus. This detection function is by itself one aspect of the present invention in the form of a method or a device.

In other words, a different aspect of the present invention is a camera motion and/or pose determination device. Another aspect of the present invention is a device for determining motion and/or pose of a moving structure on which a camera is mounted. While these aspects can be favorably used for object recognition, they can also be used for other purposes.

For example, vehicle motion (or pose) can be recognized using the present invention. The determined motion may be used to perform vehicle control, and traction control may be implemented favorably using such motion. It is advantageous in that sensors to be installed on the vehicle can be reduced. Alternatively, by using vehicle sensors along with the present invention, reliability can be enhanced.

A further aspect of the present invention may be a road gradient determination method or apparatus.

In another aspect of the present invention, camera orientation is determined. Preferably, a means is provided for adjusting the camera orientation according to the determined results. In this aspect, the above-described function for determining the angle between the camera axis and the vehicle axis (camera angle) is used (see FIG. 10).

The camera angle determining function is one notable advantage of the present invention. Conventionally, when the steering device is maintained in the neutral position and the vehicle is traveling straight ahead, it was difficult to measure the vehicle axis which indicates the vehicle travel direction. The camera angle estimated in the present invention, on the other hand, indicates the angle created between the vehicle axis and the camera axis in the YZ plane in the vehicle coordinates. This camera angle calculated using optical flow can be used to adjust the installation angle, allowing adaptation to system changes after initial assembly.

A number of variations of the present invention have been described above. Note that the present invention may be implemented in an embodiment of a method or an apparatus. The present invention can also be implemented in a form of a recording medium. The above-described recognition method and the motion determination method may be stored in a recording medium as a program. The recording medium retains data using electrical, magnetic, or optical means.

The main advantageous effects of the present invention are collectively explained below.

Small objects can be accurately recognized by tracking possible objects in the environment recognition processing according to the present invention. Accurate recognition is similarly possible when the camera movement velocity is small and the interval between the photographing of the images is small.

As a result of this tracking, the influence of photographing conditions can be reduced, and the ability to recognize objects having a color similar to the background can be improved according to the present invention.

The accuracy in recognizing the location and size can be enhanced according to the present invention by performing recognition based on camera motion. Camera motion (rate of change) is accumulated to be effectively used as the camera movement amount. The recognition accuracy is further enhanced by performing recognition processing based on camera motion and camera pose. Although the recognition accuracy would be restricted, it is also possible to use only the camera motion.

As the photographed images on which the recognition is based can be used for the determination of camera motion and pose in addition to the recognition processing itself, sensor cost can be reduced in the present invention.

Reliability can be improved by using sensors together with the photographed images in determining camera motion and pose according to the present invention.

In the present invention, the flow parameters in the images are converted into physical parameters in terms of three-dimensional coordinates when determining camera motion and pose. Motion data can therefore be accumulated easily, enabling accurate recognition.

This point associated with the parameter conversion is one of the significant effects of the present invention. As previously explained, in an optical flow resulting from two images, the difference between the vectors of an object and the background is not apparent, and it is difficult to detect the object. It may be possible to accumulate the optical flows, but optical flow data is basically unsuitable for accumulation. Even if optical flow data are accumulated, three-dimensional shapes cannot be determined because optical flow data describes two-dimensional images. According to the present invention, on the other hand, physical parameters in terms of three-dimensional coordinates are accumulated. Accordingly, it is possible to understand how the camera moved during tracking, and the three-dimensional shape of the object captured in the images can be determined using the accumulated information. In this way, object recognition capability can be greatly enhanced according to the present invention.

As the Extended Kalman Filter is used for determining the camera motion and pose in the present invention, non-linear flow parameters can be successfully processed, and the influence of image noise can be reduced, providing a practical detection device.

Recognition performance is further enhanced according to the present invention by performing recognition processing based on the gradient of the surface on which the camera moves. The road gradient is successfully calculated by comparing the pitch angle detected by a sensor and the pitch angle estimated by image processing. A Kalman Filter may favorably be used again for the gradient calculation.

Non-linear data can be successfully processed under presence of noise during t-he object recognition according to the present invention by similarly using a Kalman Filter capable of non-linear processing.

According to the present invention, a plurality of objects successively appearing in the images can be reliably detected by providing a plurality of Kalman Filter processors for recognition processing and simultaneously performing the processing for the plurality of possible objects.

Information on irregularities in the road or other surface can be obtained by dividing each image into a plurality of sections and performing recognition processing for the respective divided sections according to the present invention.

Three-dimensional maps can be created using the shape information obtained as the recognition results in the present invention.

Enhanced safety can be achieved by detecting obstacles located ahead of the vehicle through the environment recognition according to the present invention.

The camera motion information and pose information of the present invention can be used in various applications including, but in no way limited to, vehicle control.

What is claimed is:

1. An environment recognition method for recognizing, through image processing, an object captured in images, comprising:
   a step of capturing a sequence of images using a single moving camera; and
   a step of recognition processing including identifying a possible object captured in an image, tracking the identified possible object within the image sequence, and generating three-dimensional information on the object based on a magnitude of a positional change within an image frame of the possible object, wherein, in the recognition processing step, flow parameters of the sequence of images in image coordinates are converted into physical parameters in three-dimensional coordinates, the physical parameters indicating motion information of the camera side.

2. The environment recognition method defined in claim 1 wherein:
   the camera is mounted on a vehicle;
   the possible object is a possible obstacle on the road; and
   the three-dimensional information on the object includes the height of the possible object.

3. The environment recognition method defined in claim 1 further comprising:
   a step of determining camera motion during the tracking; wherein
      in the recognition processing step, the recognition processing is performed by relating the camera motion to the tracking information.

4. The environment recognition method defined in claim 3 wherein:
   the motion determining step further includes determining camera pose during the tracking; and
   in the recognition processing step, the recognition processing is performed by relating the camera motion and the camera pose to the tracking information.

5. The environment recognition method defined in claim 3 wherein
   in the motion determining step, the instantaneous camera motion at a point along the camera's movement is determined from the image sequence.

6. The environment recognition method defined in claim 5 wherein
   in the motion determining step, the camera motion is determined using a detection signal from a motion sensor in addition to the image sequence.

7. The environment recognition method defined in claim 5 wherein
   in the motion determining step, the camera motion is determined by converting flow parameters of the image sequence in image coordinates into physical parameters in three-dimensional coordinates.

8. The environment recognition method defined in claim 7 wherein
   a Kalman Filter capable of non-linear processing is used in the motion determining step.

9. The environment recognition method defined in claim 3 further comprising:
   a step of determining the gradient of a surface on which the camera moves; and
   in the recognition processing step, the recognition processing is performed by relating the camera motion and the gradient to the tracking information.

10. The environment recognition method defined in claim 9 wherein
   in the gradient determining step, the gradient information is generated based on a difference between an estimated pitch angle estimated from the image sequence as the camera motion and a detected pitch angle detected using a sensor.

11. The environment recognition method defined in claim 9 wherein
   a Kalman Filter capable of non-linear processing is used in the gradient determining step.

12. The environment recognition method defined in claim 1 wherein
   a Kalman Filter capable of non-linear processing is used in the recognition processing step.

13. The environment recognition method defined in claim 12 wherein
   a plurality of Kalman Filters are used to simultaneously perform the recognition processing for a plurality of possible objects by activating at least one Kalman Filter for a new possible object when such a new possible object is detected.

14. The environment recognition method defined in claim 1 further comprising
   a step of dividing each of the images into a plurality of sections and generating information concerning irregularities in the region based on results of the recognition processing for the respective divided sections.

15. An environment recognition apparatus for recognizing, through image processing, an object captured in camera images photographing a surrounding region, comprising:
   a camera mounted on a moving structure for obtaining images of at least a portion of a surrounding region; and
   a recognition process unit for generating three-dimensional information concerning an object captured in a sequence of images photographed by the camera; wherein
      the recognition process unit identifies a possible object captured in an image, tracks the identified possible object within the image sequence, and generates the three-dimensional information on the object based on a magnitude of a positional change within an image frame of the possible object, wherein, in the recognition processing unit, flow parameters of the sequence of images in image coordinates are converted into physical parameters in three-dimensional coordinates, the physical parameters indicating motion information of the camera side.

16. The environment recognition apparatus defined in claim 15 wherein
   the recognition process unit further includes means for determining the instantaneous motion of the camera based on the photographed image sequence, and performs recognition-processing by relating the camera motion to the tracking information.

17. The environment recognition apparatus defined in claim 16 wherein
   the recognition process unit further includes means for determining camera pose along with the camera motion, and performs the recognition processing by relating the camera motion and the camera pose to the tracking information.

18. The environment recognition apparatus defined in claim 17 wherein:
   the recognition process unit includes a Kalman Filter capable of non-linear processing; and
   the Kalman Filter calculates the camera motion by converting flow parameters of the image sequence in image coordinates into physical parameters in three-dimensional coordinates.

19. The environment recognition apparatus defined in claim 16 wherein
the recognition process unit further includes means for determining gradient of a surface on which the camera is moving, and performs recognition processing by relating the camera motion and the gradient to the tracking information.

20. The environment recognition apparatus defined in claim 19 comprising:
a pitch sensor for detecting a pitch angle of the camera; wherein
the gradient determining means include a Kalman Filter capable of non-linear processing, and the Kalman Filter generates gradient information based on a difference between an estimated pitch angle estimated from the image sequence and a detected pitch angle detected using the sensor.

21. The environment recognition apparatus defined in claim 16 wherein
the recognition process unit includes a Kalman Filter capable of non-linear processing used for the recognition processing, and performs accumulation of the camera motion and object recognition based on the accumulated information using the Kalman Filter for the recognition processing.

22. The environment recognition apparatus defined in claim 21 wherein
the recognition process unit includes a plurality of Kalman Filter processors for the recognition processing, and assigns at least one Kalman Filter to each of successively identified new possible objects.

23. The environment recognition apparatus defined in claim 15 wherein
the recognition process unit divides each of the images into a plurality of sections, performs the recognition processing for the respective divided sections, and generates information concerning unevenness between the sections.

24. An environment recognition method for recognizing, through image processing, a photographed object captured in camera images, comprising:
a step of obtaining a sequence of images using a single moving camera; and
a step of recognition processing including tracking the photographed object within the image sequence, and generating three-dimensional information on the photographed object based on a magnitude of a positional change within an image frame of the photographed object, wherein, in the recognition processing step, flow parameters of the sequence of images in image coordinates are converted into physical parameters in three-dimensional coordinates, the physical parameters indicating motion information of the camera side.

25. The environment recognition method defined in claim 24, further comprising:
a step of determining the motion of photographing side based on the image sequence; wherein
in the recognition processing step, the recognition processing is performed by relating the motion to the tracking information.

26. The environment recognition method defined in claim 24, further comprising:
a step of determining motion and pose of the photographing side based on the image sequence, wherein
in the recognition processing step, the recognition processing is performed by relating the motion and the pose to the tracking information.

27. A method for determining motion of a camera or a moving structure on which the camera is mounted, comprising the steps of:
capturing a plurality of images using a single moving camera; and
determining the motion using the plurality of images; wherein
in the motion determining step, flow parameters of the plurality of images in image coordinates are converted into physical parameters in three-dimensional coordinates, the physical parameters indicating motion information of the camera side.

28. An apparatus for determining motion of a camera or a moving structure on which the camera is mounted, comprising:
a camera mounted on a moving structure for obtaining images of at least a portion of a surrounding region of the moving structure while the moving structure moves; and
means for determining the motion using the plurality of images; wherein
the motion determining means convert flow parameters of the plurality of images in image coordinates into physical parameters in three-dimensional coordinates, the physical parameters indicating motion information of the camera side.

29. The motion determination apparatus defined in claim 28 wherein
a detection signal from a motion sensor is used in addition to the plurality of images to determine the motion.

30. The motion determination apparatus defined in claim 28 wherein
the motion determining means include a Kalman Filter capable of non-linear processing.

31. A method for determining gradient of a surface on which a camera moves using images photographed by the camera, comprising the steps of:
capturing a plurality of images using a single moving camera;
estimating a pitch angle of the camera or of a moving structure on which the camera is mounted by converting flow parameters obtained from the plurality of images into physical parameters in three-dimensional coordinates;
detecting pitch angle information of the camera or the moving structure on which the camera is mounted using a pitch sensor; and
determining the gradient of a surface on which the camera is moving based on a difference between the estimated pitch angle and the detected pitch angle.

32. A map creation method for creating a three-dimensional map comprising a step of capturing a sequence of images using a single moving camera; and a step of recognition processing which includes identifying a possible object captured in an image, tracking the identified possible object within the image sequence, and generating three-dimensional information on the object based on information obtained by the tracking concerning changes in images of the possible object, wherein in the recognition processing step flow parameters of the sequence of images in image coordinates are converted into physical parameters in three-dimensional coordinates, the physical parameters indicating motion information of the camera side.

* * * * *